US012794511B2

(12) United States Patent
Elshafie et al.

(10) Patent No.: US 12,794,511 B2
(45) Date of Patent: Nov. 10, 2026

(54) RECONFIGURABLE INTELLIGENT SURFACE (RIS) SELECTION AND GROUPING FOR ACTIVATION/DEACTIVATION

(71) Applicant: QUALCOMM Incorporated, San Diego, CA (US)

(72) Inventors: Ahmed Elshafie, San Diego, CA (US); Yu Zhang, San Diego, CA (US); Hwan Joon Kwon, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 330 days.

(21) Appl. No.: 18/684,316

(22) PCT Filed: Oct. 27, 2021

(86) PCT No.: PCT/CN2021/126638

§ 371 (c)(1),
(2) Date: Feb. 16, 2024

(87) PCT Pub. No.: WO2023/070358

PCT Pub. Date: May 4, 2023

(65) Prior Publication Data

US 2024/0356586 A1 Oct. 24, 2024

(51) Int. Cl.
*H04B 7/04* (2017.01)
*H04L 5/00* (2006.01)

(52) U.S. Cl.
CPC ....... *H04B 7/04013* (2023.05); *H04L 5/0048* (2013.01)

(58) Field of Classification Search
CPC ............ H04B 7/04013; H04B 7/15528; H04B 7/0617; H04L 5/0048; H04L 27/2601;
(Continued)

(56) References Cited

U.S. PATENT DOCUMENTS

2021/0234591 A1 7/2021 Eleftheriadis et al.
2021/0384958 A1* 12/2021 Denis .................... H04B 7/145
(Continued)

FOREIGN PATENT DOCUMENTS

CN 110839204 A 2/2020
CN 112564752 A 3/2021
(Continued)

OTHER PUBLICATIONS

Araujo G.T, et al., "Channel Estimation for Intelligent Reflecting Surface Assisted MIMO Systems: A Tensor Modeling Approach", IEEE Journal of Selected Topics in Signal Processing, Apr. 30, 2021, pp. 789-802, No. 3, vol. 15, arxiv.org, Cornell University Library, 201 Olin Library Cornell University Ithaca, NY 14853, Aug. 10, 2020 (Aug. 10, 2020), pp. 1-13, XP081738315, Sections I-VI, Sections III-VI, Figures 1-2.
(Continued)

*Primary Examiner* — Chae S Lee
(74) *Attorney, Agent, or Firm* — Patterson + Sheridan, L.L.P.

(57) ABSTRACT

Certain aspects of the present disclosure relate to wireless communications, and more particularly, to techniques for reconfigurable intelligent surface (RIS) communication. A method that may be performed by a network entity includes determining a subset of RISs controlled by the network entity to be activated or deactivated and transmitting, to each RIS of the subset of RISs, signaling activating or deactivating the subset of RISs in accordance with the determination. In response to receiving such signaling, each RIS of the subset of RISs may activate or deactivate in accordance with the signaling.

26 Claims, 12 Drawing Sheets

(58) Field of Classification Search

CPC ... H04L 5/0023; H04L 5/005; H04L 25/0202; H04W 24/02; H04W 52/0206; H04W 72/1268; H04W 72/21; H04W 72/231; H04W 72/232; H01Q 15/0006

See application file for complete search history.

(56) References Cited

U.S. PATENT DOCUMENTS

| | | | | |
|---|---|---|---|---|
| 2023/0007522 | A1 | 1/2023 | Yang et al. | |
| 2023/0146485 | A1* | 5/2023 | Jian | H04B 7/04013 455/11.1 |
| 2023/0308140 | A1* | 9/2023 | Baligh | H04B 7/04013 |
| 2024/0357486 | A1* | 10/2024 | Wang | H04W 52/0203 |
| 2024/0413886 | A1* | 12/2024 | Yoshioka | H04B 7/155 |
| 2025/0254017 | A1* | 8/2025 | Yoshioka | H04L 5/14 |

FOREIGN PATENT DOCUMENTS

| | | | |
|---|---|---|---|
| CN | 113163325 | A | 7/2021 |
| WO | 2020231868 | A1 | 11/2020 |
| WO | 2020257267 | A2 | 12/2020 |
| WO | 2021180053 | A1 | 9/2021 |
| WO | 2022147415 | A1 | 7/2022 |
| WO | 2023027841 | A1 | 3/2023 |

OTHER PUBLICATIONS

International Search Report and Written Opinion—PCT/CN2021/126638—ISA/EPO—Jul. 27, 2022.

Jung M., et al., "On the Optimality of Reconfigurable Intelligent Surfaces (RISs): Passive Beamforming, Modulation, and Resource Allocation", IEEE Transactions on Wireless Communications, Jul. 31, 2021, pp. 1-16, No. 7, vol. 20, the whole document.

KDDI Corporation: "NR Repeaters and Reconfigurable Intelligent Surface", 3GPP TSG RAN Rel-18 Workshop, RWS-210300, 3rd Generation Partnership Project, Mobile Competence Centre, 650, Route Des Lucioles, F-06921 Sophia-Antipolis Cedex, France, vol. TSG RAN, No. Electronic Meeting, Jun. 28, 2021-Jul. 2, 2021, 5 Pages, Jun. 7, 2021, XP052025854, the whole document.

Supplementary European Search Report EP21961734 Search Authority Munich Oct. 13, 2025.

You C., et al., "How to Deploy Intelligent Reflecting Surfaces in Wireless Network: BS-side, User-side, or Both Sides?", arXiv:2012.03403v2 [cs.IT], Arxiv.Org, Cornell University Library, 201 Olin Library Cornell University Ithaca, NY 14853, Dec. 7, 2020, pp. 1-8, XP081831530, abstract Introduction, ISR-User association and mode selection, IRS placement and elements allocation.

Supplementary Partial European Search Report—EP21961734—Search Authority—Munich—Jun. 13, 2025.

Wymeersch H., et al., "Radio Localization and Mapping with Reconfigurable Intelligent Surfaces: Challenges, Opportunities, and Research Directions", IEEE Vehicular Technology Magazine, IEEE, US, vol. 15, No. 4, Oct. 7, 2020, pp. 52-61, XP011821427, abstract, Siganlling and System Architecture, figure 4.

* cited by examiner

RECONFIGURABLE INTELLIGENT SURFACE (RIS) SELECTION AND GROUPING FOR ACTIVATION/DEACTIVATION

CROSS-REFERENCE TO RELATED APPLICATIONS

This application is a national stage application under 35 U.S.C. 371 of PCT/CN2021/126638, filed Oct. 27, 2021, which is hereby expressly incorporated by reference herein in its entirety as if fully set forth below and for all applicable purposes.

BACKGROUND

Field of the Disclosure

Aspects of the present disclosure relate to wireless communications, and more particularly, to reconfigurable intelligent surface (RIS) communication.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink (DL) channels (e.g., for transmissions from a BS or DU to a UE) and uplink (UL) channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the DL and on the UL. To these ends, NR supports beamforming, multiple-input multiple-output (MIMO) antenna technology, and carrier aggregation.

As the demand for mobile broadband access continues to increase, there exists a need for further improvements in NR and LTE technology. These improvements should be applicable to other multi-access technologies and the telecommunication standards that employ these technologies.

SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages that include improved communications between devices in a wireless network.

One or more aspects of the subject matter described in this disclosure can be implemented in a method for wireless communications by a network entity. The method generally includes determining a subset of reconfigurable intelligent surfaces (RISs) controlled by the network entity to be activated or deactivated; and transmitting, to each RIS of the subset of RISs, signaling activating or deactivating the subset of RISs in accordance with the determination.

One or more aspects of the subject matter described in this disclosure can be implemented in a method for wireless communications by a user equipment (UE). The method generally includes receiving, from a network entity, signaling to be transmitted to each RIS of a subset of RISs controlled by the network entity, wherein the signaling is used to activate or deactivate the subset of RISs; and forwarding the signaling to each RIS of the subset of RISs.

One or more aspects of the subject matter described in this disclosure can be implemented in an apparatus for wireless communication by a network entity. The apparatus generally includes a memory and at least one processor coupled with the memory. The at least one processor coupled with the memory is generally configured to determine a subset of RISs controlled by the network entity to be activated or deactivated; and transmit, to each RIS of the subset of RISs, signaling activating or deactivating the subset of RISs in accordance with the determination.

One or more aspects of the subject matter described in this disclosure can be implemented in an apparatus for wireless communication by a UE. The apparatus generally includes a memory and at least one processor coupled with the memory. The at least one processor coupled with the memory is generally configured to receive, from a network entity, signaling to be transmitted to each RIS of a subset of RISs controlled by the network entity, wherein the signaling is used to activate or deactivate the subset of RISs; and forward the signaling to each RIS of the subset of RISs.

One or more aspects of the subject matter described in this disclosure can be implemented in an apparatus for wireless communication. The apparatus generally includes means for determining a subset of RISs controlled by the network entity to be activated or deactivated; and means for transmitting, to each RIS of the subset of RISs, signaling activating or deactivating the subset of RISs in accordance with the determination.

One or more aspects of the subject matter described in this disclosure can be implemented in an apparatus for wireless communication. The apparatus generally includes means for receiving, from a network entity, signaling to be transmitted to each RIS of a subset of RISs controlled by the network entity, wherein the signaling is used to activate or deactivate the subset of RISs; and means for forwarding the signaling to each RIS of the subset of RISs.

One or more aspects of the subject matter described in this disclosure can be implemented in a computer readable medium having computer executable code stored thereon. The computer readable medium having computer executable code stored thereon generally includes code for determining a subset of reconfigurable intelligent surfaces (RISs) controlled by the network entity to be activated or deactivated; and code for transmitting, to each RIS of the subset of RISs, signaling activating or deactivating the subset of RISs in accordance with the determination.

One or more aspects of the subject matter described in this disclosure can be implemented in a computer readable medium having computer executable code stored thereon. The computer readable medium having computer executable code stored thereon generally includes code for receiving, from a network entity, signaling to be transmitted to each RIS of a subset of RISs controlled by the network entity, wherein the signaling is used to activate or deactivate the subset of RISs; and code for forwarding the signaling to each RIS of the subset of RISs.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure, and the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
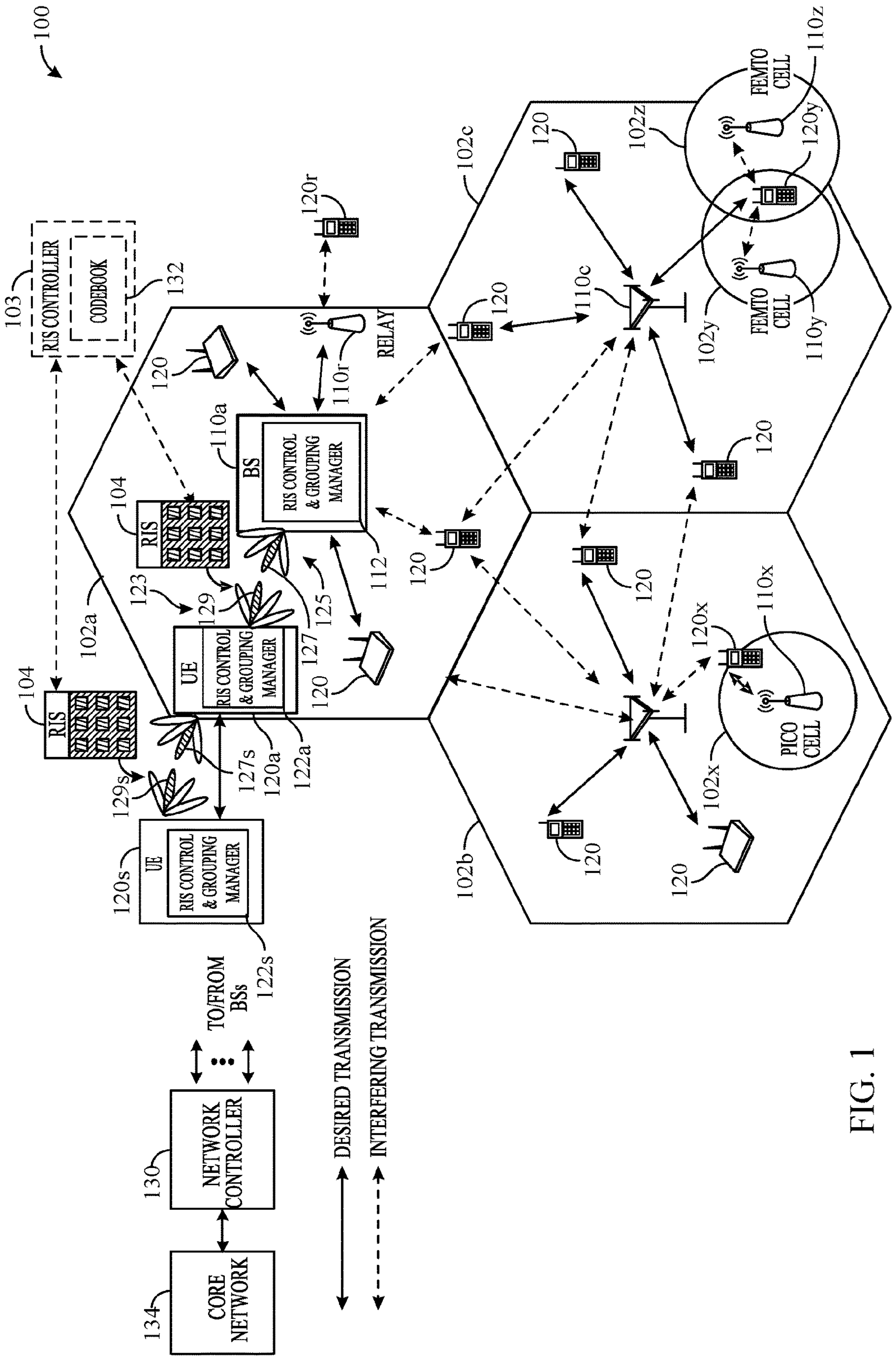
FIG. 1 is a block diagram conceptually illustrating an example telecommunications system, including a reconfigurable intelligent surface (RIS), in accordance with certain aspects of the present disclosure.

Reconfigurable intelligent surfaces (RISs) may be implemented to improve wireless communication coverage and capacity by intelligently controlling the propagation environment. However, due to the uncontrollable nature of reflections at an RIS when turned on, the likelihood of interference with transmissions from other user equipments (UEs), or from the same UE (e.g., inter-symbol interference), is significantly increased. Further, in systems deploying multiple RISs, channel estimation may be challenging, and in some cases, prohibitively increase the overhead for channel estimation (e.g., given overhead for cascaded channel estimation is based, at least in part, on the number of RIS reflective elements in the system). Thus, for at least these reasons, it may be beneficial to control the selection, or grouping, of RISs that are activated and/or deactivated at a time.

Aspects of the present disclosure provide apparatus, methods, processing systems, and computer readable mediums for activation and/or deactivation of RISs (or groups of RISs) when multiple RISs are available. For example, aspects herein describe the selection of RIS(s), the grouping of RIS(s), and the pairing of one or more RISs to one or more UEs (e.g., UE-RIS pairing) for activation/deactivation. Based upon the selection, grouping, and/or pairing, signaling may be introduced to control the state of one or more RISs. A state of an RIS may be either an awake state where the RIS is activated or a sleep state where the RIS is deactivated. As used herein, activate means to turn on and participate in ongoing activity in an RIS-aided wireless communication system, and more specifically, turn on and aid in the reflection and beamforming of one or more transmissions.

Accordingly, the techniques described herein enable a network entity (e.g., a base station (BS)) to intelligently make decisions regarding the selection and control of RIS(s) in an RIS-aided wireless communication system such that, at least, transmission interference may be avoided or decreased, channel estimation and/or positioning may be accommodated, signaling overhead may be decreased, and power consumption may be saved at the network entity.

The following description provides examples, and is not limiting of the scope, applicability, or examples set forth in the claims. Changes may be made in the function and arrangement of elements discussed. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method, which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 megahertz (MHz) or beyond), millimeter wave (mmW) targeting high carrier frequency (e.g., 25 gigahertz (GHz) or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QOS) requirements. In addition, these services may co-exist in the same subframe. NR supports beamforming and beam direction may be dynamically configured. Multiple-input multiple-output (MIMO) transmissions with precoding may also be supported. MIMO configurations in the downlink (DL) may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

Example Wireless Communications System

FIG. 1 illustrates an example wireless communication system 100 in which aspects of the present disclosure may be performed. For example, the wireless communication system 100 may be a New Radio (NR) system (e.g., a 5G NR network). As shown in FIG. 1, the wireless communication system 100 may be in communication with a core network 134. The core network 134 may be in communication with one or more BSs 110 and/or UEs 120 in the wireless communication system 100 via one or more interfaces.

As illustrated in FIG. 1, a user equipment (UE), such as UE 120 (e.g., including UEs 120*a* and 120*s*) in the wireless communication system 100 communicates with a serving base station (BS) 110, such as BS 110*a* in cell 102*a* in the wireless communication system 100. UE 120*a* may be configured with multiple transmission configurations (e.g., antenna arrays/panels and/or beams) for uplink (UL) transmission to BS 110*a*. In some cases, UE 120*a* may be configured with multiple transmission configurations for sidelink transmission to another UE, e.g., UE 120*s*.

Figure 2:
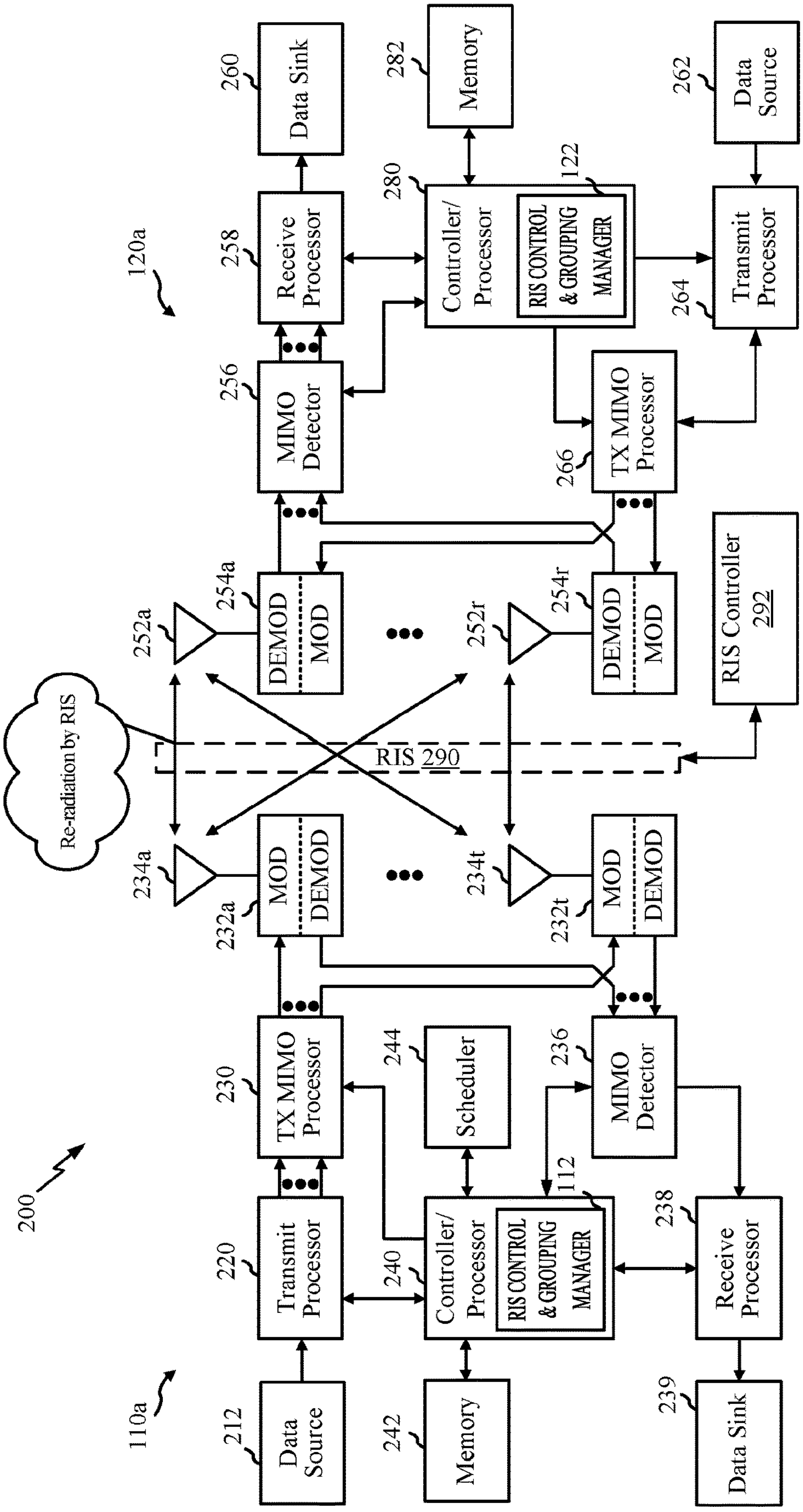
FIG. 2 is a block diagram conceptually illustrating a design of an example base station (BS), user equipment (UE), and RIS, in accordance with certain aspects of the present disclosure.

In certain aspects, communication between BS 110*a* (e.g., next generation NodeB (gNB or gNodeB)) and UE 120*a* may be blocked by obstacles (e.g., buildings, etc.) and require assistance from a reconfigurable intelligent surface (RIS) 104 (also shown in FIGS. 2 and 3). RIS 104 enables communications between BS 110*a* and UE 120*a* to be received and re-radiated, thereby avoiding the obstacles. For example, RIS 104 may be configured with a codebook for precoding one or more elements thereon (referred to as RIS elements) to allow a beam from one of BS 110*a* or UE 120*a* (e.g., a transmitter) to be re-radiated off the RIS to reach the other one of BS 110*a* or UE 120*a* (e.g., a receiver). The direction of the re-radiation by RIS 104 may be controlled or reconfigured by RIS controller 103 of the RIS 104.

RIS controller 103 includes a codebook 132 for applying a beamformer (e.g., precoding weights) according to RIS elements of RIS 104. Codebook 132 includes values of weights to configure each RIS element (or each group of RIS elements) to modify the radio signal re-radiated by each RIS element, such as weight shifting or changing amplitudes.

In an example, when UE 120*a* is the transmitter and communicates with BS 110*a* (e.g., over a wireless Uu interface), BS 110*a* is the receiver that provides RIS controller 103 feedback for selecting beamformer values for the RIS elements. Similarly, when UE 120*a* establishes a sidelink (e.g., PC5 interface) with UE 120*s*, UE 120*a* may be the transmitter and UE 120*s* may be the receiver that provides RIS controller 103 feedback. Codebook 132 may be generated based on specific settings of BS 110*a* and UE 120*a*, and based on different parameters specific to different situations. The feedback from the receiver to the RIS controller 103 allows for the selection of beamformer values for reflecting communications between the transmitter and the receiver. Other configurations in wireless communication system 100 can be similarly setup between the UEs 120 and BSs 110.

BS 110*a*, UE 120*a*, and/or UE 120*s* (including UE 120*s*) may respectively include an RIS control and grouping manager (e.g., RIS control and grouping manager 112 for BS 110*a*, RIS control and grouping manager 122*a* for UE 120*a*, and RIS control and grouping manager 122*s* for UE 120*s*) for controlling activation and/or deactivation of RISs (or groups of RISs) when multiple RISs are available. Further, RIS control and grouping manager 112 may be configured to perform operations 700 of FIG. 7, while RIS control and grouping manager 122*a* or RIS control and grouping manager 122*s* may be configured to perform operations 800 of FIG. 8.

As illustrated in FIG. 1, wireless communication system 100 may include a number of BSs 110 and other network entities. A BS 110 may be a station that communicates with UEs 120. Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and gNB or gNodeB, NR BS, 5G NB, access point (AP), or transmission reception point (TRP) may be interchangeable. In some examples, a cell may not necessarily be stationary, and the geographic area of the cell may move according to the location of a mobile BS. In some examples, BSs 110 may be interconnected to one another and/or to one or more other BSs 110 or network nodes (not shown) in wireless communication system 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS 110 may provide communication coverage for a macro cell, a pico cell, a femto cell, and/or other types of cells. A macro cell may cover a relatively large geographic area (e.g., several kilometers in radius) and may allow unrestricted access by UEs 120 with service subscription. A pico cell may cover a relatively small geographic area and may allow unrestricted access by UEs 120 with service subscription. A femto cell may cover a relatively small geographic area (e.g., a home) and may allow restricted access by UEs 120 having an association with the femto cell (e.g., UEs 120 in a Closed Subscriber Group (CSG), UEs 120 for users in the home, etc.). A BS 110 for a macro cell may be referred to as a macro BS. A BS 110 for a pico cell may be referred to as a pico BS. A BS 110 for a femto cell may be referred to as a femto BS or a home BS. In the example shown in FIG. 1, the BSs 110*a*, 110*b*, and 110*c* may be macro BSs for the macro cells 102*a*, 102*b* and 102*c*, respectively. The BS 110*x* may be a pico BS for a pico cell 102*x*. The BSs 110*y* and 110*z* may be femto BSs for the femto cells 102*y* and 102*z*, respectively. A BS 110 may support one or multiple (e.g., three) cells.

Wireless communication system 100 may also include relay stations. A relay station is a station that receives a transmission of data and/or other information from an upstream station (e.g., a BS 110 or a UE 120) and sends a transmission of the data and/or other information to a downstream station (e.g., a UE 120 or a BS 110). A relay station may also be a UE 120 that relays transmissions for other UEs 120. In the example shown in FIG. 1, a relay station 110*r* may communicate with the BS 110*a* and a UE 120*r* in order to facilitate communication between the BS 110*a* and the UE 120*r*. A relay station may also be referred to as a relay BS, a relay, etc.

Wireless communication system 100 may be a heterogeneous network that includes BSs of different types, e.g., macro BS, pico BS, femto BS, relays, etc. These different types of BSs may have different transmit power levels, different coverage areas, and different impact on interference in the wireless communication system 100. For example, macro BS may have a high transmit power level (e.g., 20 Watts) whereas pico BS, femto BS, and relays may have a lower transmit power level (e.g., 1 Watt).

Wireless communication system 100 may support synchronous or asynchronous operation. For synchronous operation, the BSs 110 may have similar frame timing, and transmissions from different BSs 110 may be approximately aligned in time. For asynchronous operation, the BSs 110 may have different frame timing, and transmissions from different BSs 110 may not be aligned in time. The techniques described herein may be used for both synchronous and asynchronous operation.

A network controller 130 may couple to a set of BSs 110 and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120*a*, 120*s*, 120*x*, 120*y*, etc.) may be dispersed throughout the wireless communication system 100, and each UE 120 may be stationary or mobile. A UE 120 may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs 120 may be considered machine-type communication (MTC) devices or evolved MTC (eMTC) devices. MTC and eMTC UEs include, for example, robots, drones, remote devices, sensors, meters, monitors, location tags, etc., that may communicate with a BS 110, another device (e.g., remote device), or some other entity. A wireless node may provide, for example, connectivity for or to a network (e.g., a wide area network such as Internet or a cellular network) via a wired or wireless communication link. Some UEs 120 may be considered Internet-of-Things (IOT) devices, which may be narrowband IoT (NB-IOT) devices.

Certain wireless networks (e.g., LTE) utilize orthogonal frequency division multiplexing (OFDM) on the downlink (DL) and single-carrier frequency division multiplexing (SC-FDM) on the UL. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz) and the minimum resource allocation (called a "resource block" (RB)) may be 12 subcarriers (or 180 kHz). Consequently, the nominal Fast Fourier Transfer (FFT) size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.8 MHz (i.e., 6 RBs), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a cyclic prefix (CP) on the UL and DL and include support for half-duplex operation using time division duplexing (TDD). Beamforming may be supported and beam direction may be dynamically configured. Multiple-input multiple-output (MIMO) transmissions with beamformer may also be supported. MIMO configurations in the DL may support up to 8 transmit antennas with multi-layer DL transmissions up to 8 streams and up to 2 streams per UE 120. Multi-layer transmissions with up to 2 streams per UE 120 may be supported. Aggregation of multiple cells may be supported with up to 8 serving cells.

In some examples, access to the air interface may be scheduled. A scheduling entity (e.g., a BS 110) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs 110 are not the only entities that may function as a scheduling entity. In some examples, a UE 120 may function as a scheduling entity and may schedule resources for one or more subordinate entities (e.g., one or more other UEs 120), and the other UEs 120 may utilize the resources scheduled by the UE 120 for wireless communication. In some examples, a UE 120 may function as a scheduling entity in a peer-to-peer (P2P) network, and/or in a mesh network. In a mesh network example, UEs 120 may communicate directly with one another in addition to communicating with a scheduling entity.

In FIG. 1, a solid line with double arrows indicates desired transmissions between a UE 120 and a serving BS 110, which is a BS 110 designated to serve the UE 120 on the DL and/or UL. A finely dashed line with double arrows indicates interfering transmissions between a UE 120 and a BS 110.

FIG. 2 illustrates example components 200 of BS 110 and UE 120 (as depicted in FIG. 1), which may be used to implement aspects of the present disclosure. As shown, the RIS 290 may assist the communications, by receiving and re-radiating radio signals, between BS 110 and UE 120, such as when such communications are impeded or blocked by obstacles (not shown, illustrated as the blockage in FIGS. 3A and 3B). For example, RIS 290 may re-radiate the transmissions from one of BS 110 or UE 120 to the other using reflection, refraction, or other passive or active mechanisms.

RIS 290 may be reconfigured or controlled by an RIS controller 292. Each RIS element may re-radiate radio signals with certain phase or amplitude changes, such as phase shifts. RIS controller 292 may reconfigure the phase or amplitude changes by applying a beamformer weight to each RIS element or a group of RIS elements to enable RIS 290 to re-radiate an output beam at different directions given a particular input beam. An illustrative deployment example of RIS 290 is shown in FIG. 3B.

Antennas 252, processors 266, 258, 264, and/or controller/processor 280 of the UE 120 and/or antennas 234, processors 220, 230, 238, and/or controller/processor 240 of the BS 110 may be used to perform the various techniques and methods described herein. Although the present disclosure uses RIS as an example of implementing the beamformer techniques, the techniques may apply to another form of cooperative communications, such as transparent relaying or regenerative relaying implementations. As shown in FIG. 2, the controller/processor 280 of UE 120 includes an RIS control and grouping manager 122 configured to perform operations 800 of FIG. 8 and controller/processor 240 of BS 110 includes an RIS control and grouping manager 112, as described in more detail herein.

At BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. Processor 220 may also generate reference symbols, e.g., for the primary synchronization signal (PSS), secondary synchronization signal (SSS), and cell-specific reference signal (CRS). A transmit (TX) MIMO processor 230 may perform spatial processing (e.g., beamformer) on the data symbols, the control symbols, and/or the reference symbols, if applicable, and may provide output symbol streams to the modulators (MODs) 232*a* through 232*t*. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. DL signals from modulators 232*a* through 232*t* may be transmitted via the antennas 234*a* through 234*t*, respectively.

At UE 120, antennas 252*a* through 252*r* may receive the DL signals from BS 110 and may provide received signals to the demodulators (DEMODs) in transceivers 254*a* through 254*r*, respectively. Each demodulator may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254*a* through 254*r*, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the UL, at UE 120, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254*a* through 254*r* (e.g., for SC-FDM, etc.), and transmitted to the BS 110.

At BS 110, the UL signals from UE 120 may be received by the antennas 234, processed by the modulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240.

The controllers/processors 240 and 280 may direct operations at the BS 110 and the UE 120, respectively. The processor 240 and/or other processors and modules at the BS 110 may perform or direct execution of processes for techniques described herein. The memories 242 and 282 may store data and program codes for BS 110 and UE 120, respectively. A scheduler 244 may schedule UEs for data transmission on the DL and/or UL.

While communication between UEs (e.g., UE 120*a* of FIGS. 1 and 2) and BSs (e.g., BSs 110*a* of FIGS. 1 and 2) may be referred to as the access link, and the access link may be provided via a Uu interface, communication between devices may be referred to as the sidelink.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks (WLANs), which typically use an unlicensed spectrum).

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions, and the PSSCH may carry the data transmissions.

Example Application(s) of Reconfigurable Intelligent Surface(s) (RIS(s))

As discussed above, massive multiple input multiple output (MIMO) configuration increases throughput. For example, MIMO can achieve high beamforming gain by using active antenna units and can operate with individual radio frequency (RF) chains for each antenna port. To further such advantages and extend coverage, RISs may be deployed to reflect impinging waves in desired directions. In some cases, RISs may operate without substantial power consumption when they operate passively to only reflect or refract beams from a transmitter towards a receiver. In some cases, the reflection or refraction direction may be controlled by a network entity (e.g., base station (BS), next generation NodeB (gNB or gNodeB)) or a monitoring sidelink user equipment (UE).

Figure 3A:
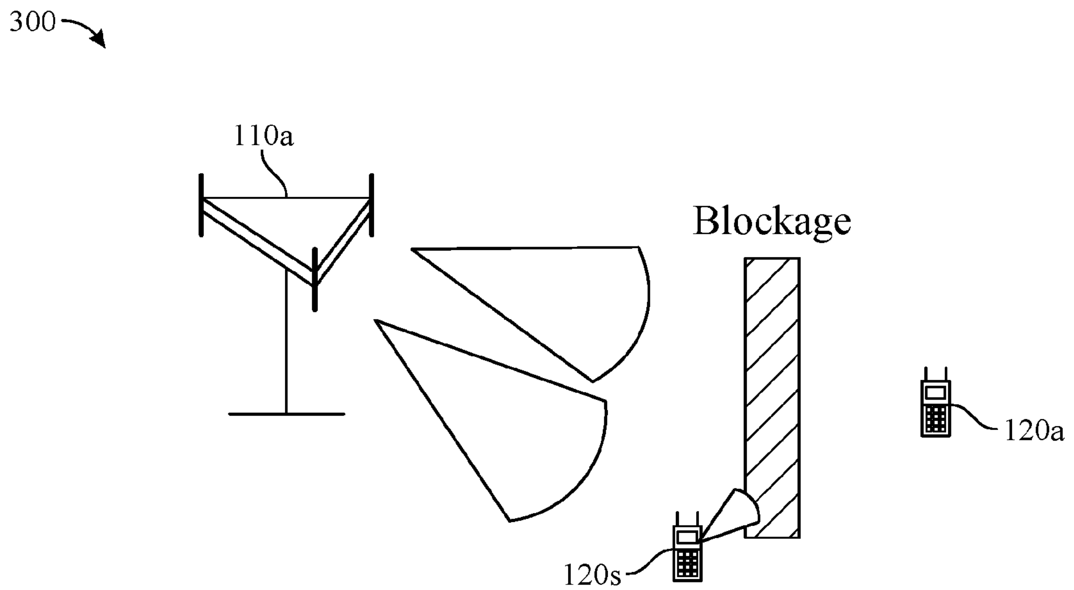
FIG. 3A illustrates an example of communication blockage between wireless communication devices, in accordance with certain aspects of the present disclosure.
Figure 3B:
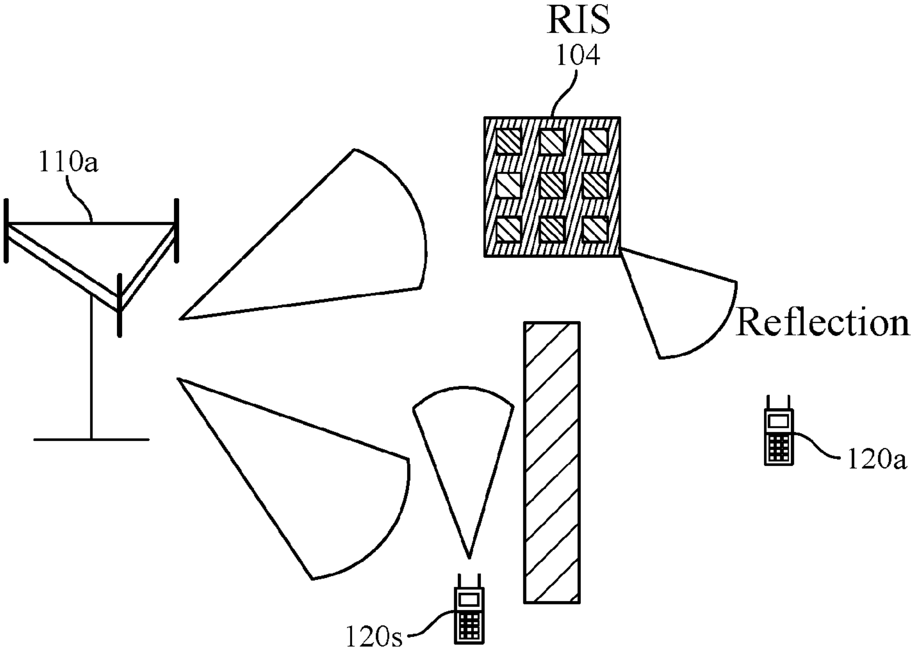
FIG. 3B illustrates an example of using a RIS to overcome impediment by obstacles between a BS and a UE, in accordance with certain aspects of the present disclosure.

FIG. 3A illustrates an example 300A of communication blockage between wireless communication devices, in accordance with certain aspects of the present disclosure. As shown, impeded by a blockage (e.g., blockages such as buildings, terrains, etc.), a network entity, BS 110*a* (e.g., BS 110*a* of the wireless communication system 100 of FIG. 1), is only able to transmit to a first UE, UE 120*s*, as transmissions may not reach a second UE, UE 120*a*, given the blockage prevents signals from reaching UE 120*a*. The blockage also prevents UE 120*s* from establishing sidelink communications with UE 120*a*. As such, UE 120*a* is prevented from communicating with BS 110*a* via UE 120*s*, using sidelink.

FIG. 3B illustrates an example 300B of using RIS 104 to overcome the blockage, in accordance with certain aspects of the present disclosure. As shown, an RIS 104 is introduced to reflect, or otherwise re-radiate, radio signals to bypass the blockage. For example, two-way communications between BS 110*a* and UE 120*a* are enabled by RIS 104 re-radiating one or more beams from BS 110*a* toward UE 120*a*, and vice versa. Furthermore, in some cases, RIS 104 is reconfigured, such as with different beamformer values, to enable UEs 120*s* and 120*a* to establish sidelink communications.

Figure 4:
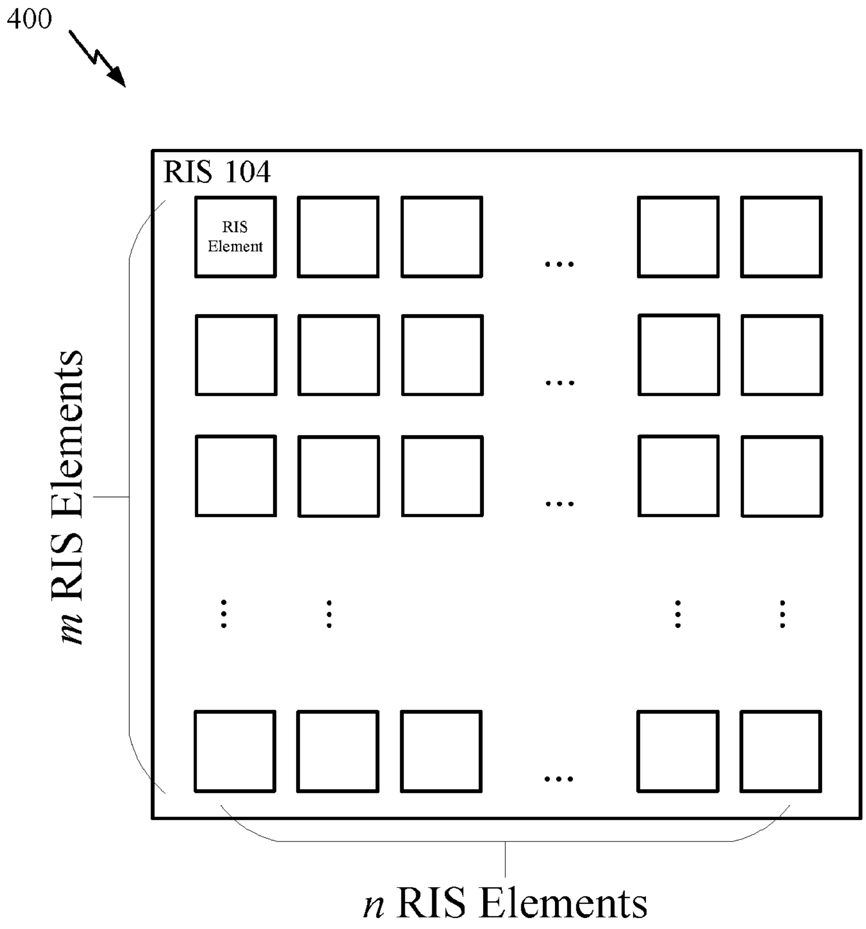
FIG. 4 illustrates an example arrangement of RIS elements, in accordance with certain aspects of the present disclosure.

FIG. 4 illustrates an example arrangement 400 of RIS elements (e.g., such as elements of RIS 104 in FIG. 3B), in accordance with certain aspects of the present disclosure. As illustrated in FIG. 4, the surface of RIS 104 consists of any array of discrete elements, such as an m×n rectangular matrix of discrete elements, that can be controlled individually or on a group level. Such elements may enable RIS 104 to perform passive beamforming. For example, RIS 104 may receive signal power from a transmitter (e.g., BS 110*a*, UE 120*a*, or UE 120*s*) proportional to the number of RIS elements thereon. When RIS 104 reflects or refracts the radio signal, elements of RIS 104 cause phase shifts to perform conventional beamforming or beamformer. The phase shifts are controlled by beamformer weights (e.g., a multiplier or an offset of time delay) applied to the elements of RIS 104. In some cases, for the array of RIS elements illustrated in FIG. 4, for example, a respective beamformer weight may be generated or specified for each of the RIS elements by the RIS controller.

Figure 5:
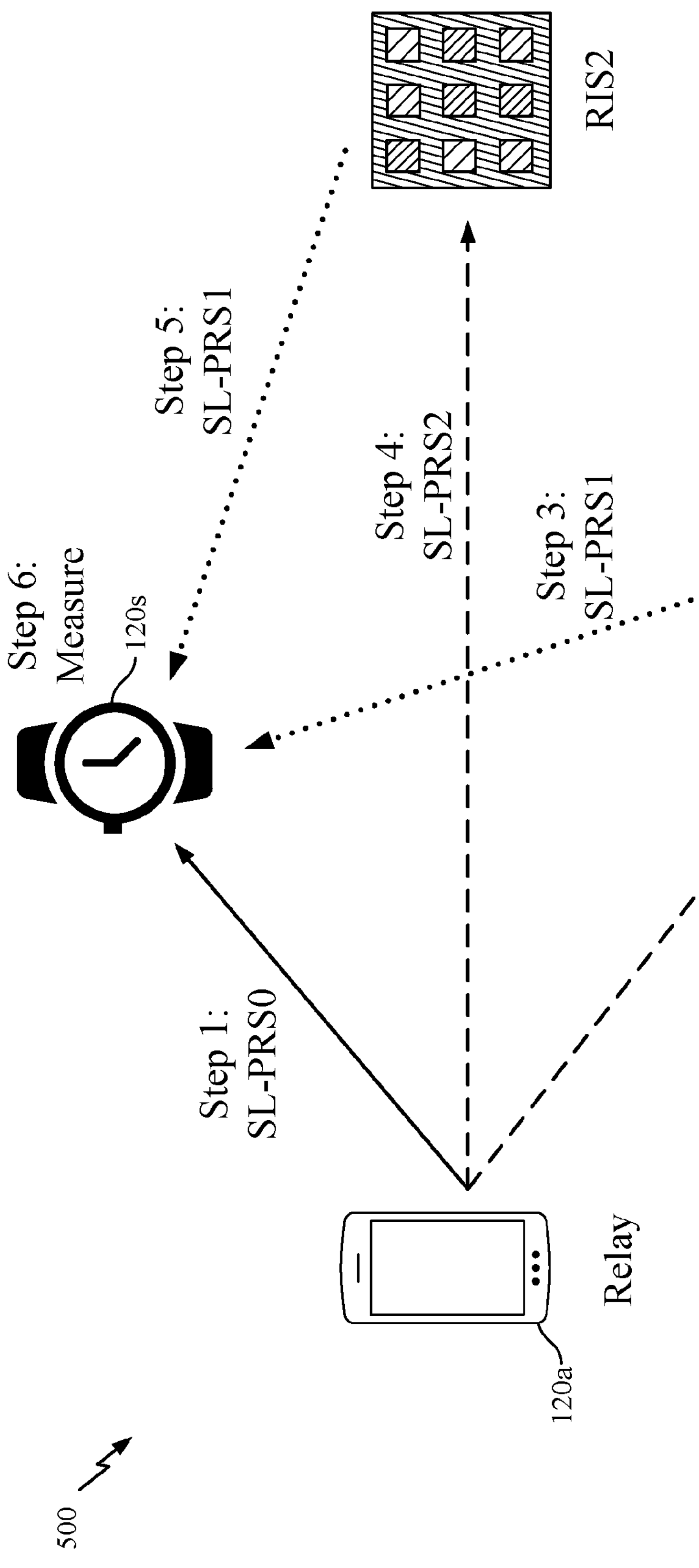
FIG. 5 illustrates an example of sidelink positioning using RISs, in accordance with certain aspects of the present disclosure.

In general, RISs enhance the coverage and capacity of wireless communication systems with low hardware cost and energy consumption. Moreover, RISs provide additional benefits in several applications, such as for example, with respect to positioning. Because an increasing awareness of objects about their own location is an essential feature of emerging systems and services in wireless communication, e.g., autonomous systems and industrial Internet of Things (IoT), positioning is seen as an integral part of the system design of 5G mobile radio networks. In particular, RISs may aid in positioning techniques because positions of RISs are generally well-known in the wireless environment. Such benefit of using RISs in positioning, for example sidelink positioning, is illustrated in FIG. 5. As used herein, sidelink positioning may refer to the measurement of a reference signal time difference (RSTD) between sidelink (SL) positioning reference signals (PRSs) (SL-PRSs) from different transmission points in order to accurately determine one's own location (e.g., perform positioning).

FIG. 5 illustrates an example of sidelink positioning 500 using RISs, in accordance with certain aspects of the present disclosure. As illustrated in FIG. 5, UE 120*s* may determine a position of UE 120*s* relative to UE 120*a*, a first RIS (e.g., RIS 1), and a second RIS (e.g., RIS 2) using a direct SL-PRS transmission and two reflected SL-PRS transmissions. According to the example presented in FIG. 5, UE 120*s* may be a remote UE (e.g., a low tier UE, such as a watch) and UE 120*a* may be a relay UE (e.g., a premium UE). At a first step, at time $t_0$, UE 120*a* transmits SL-PRS0 directly to UE 120*s*.

At a second step, at time $t_0+\Delta_1$, UE 120*a* transmits SL-PRS1 to RIS 1, which is reflected by RIS 1 to UE 120*s* at step three, at time $t_0+\Delta_1+GD_{RIS1}$ (where $GD_{RIS1}$ is XX). At a fourth step, at time $t_0+\Delta_2$, UE 120*a* transmits SL-PRS2 to RIS 2, which is reflected by RIS 2 to UE 120*s* at step five, at time $t_0+\Delta_2+GD_{RIS2}$ (where $GD_{RIS2}$ is XX). At a sixth step, UE 120*s* measures the receive time of SL-PRS0 transmitted by UE 120*a* as $t_{SL\text{-}PRS0}$, the receive time of SL-PRS1 reflected by RIS 1 as $t_{SL\text{-}PRS1}$, and the receive time of SL-PRS2 reflected by RIS 2 as $t_{SL\text{-}PRS2}$. Further, UE 120*s* measures the time different of arrival (TDOA) of PRS0, PRS1, and PRS2 from UE 120*a*, RIS 1, and RIS 2, respectively. The measured TDOA of PRS0, PRS1, and PRS2 from UE 120*a*, RIS 1, and RIS 2, respectively, is also known as the RSTD. Given the position of RIS 1 and RIS 2 are generally known, UE 120*s* may be able to determine a position of UE 120*s* relative to a position of UE 120*a*, RIS 1, and RIS 2 using this positioning technique.

Although RISs have been recognized as technology which may improve wireless communication coverage and capacity by intelligently controlling the propagation environment, realizing such benefits of implementing RISs requires accurate channel estimation, which may prove to be challenging. This is because in traditional wireless communication systems, the channel state information (CSI) can be estimated by enabling active devices (e.g., BSs, UEs, etc.) to transmit, receive, and process signals. However, in RIS-aided communication systems, an RIS is a passive device with a large number of passive reflective elements, thus there are no active transmitters or receivers at the passive RIS, so the RIS cannot perform active transmitting/receiving and/or signal processing for channel estimation. Thus, channel estimation may be challenging in environments implementing such RISs. Accordingly, to overcome the challenges in channel estimation, one or more proposed solutions involves turning on and off the RIS during specific stages of channel estimation.

Figure 6:
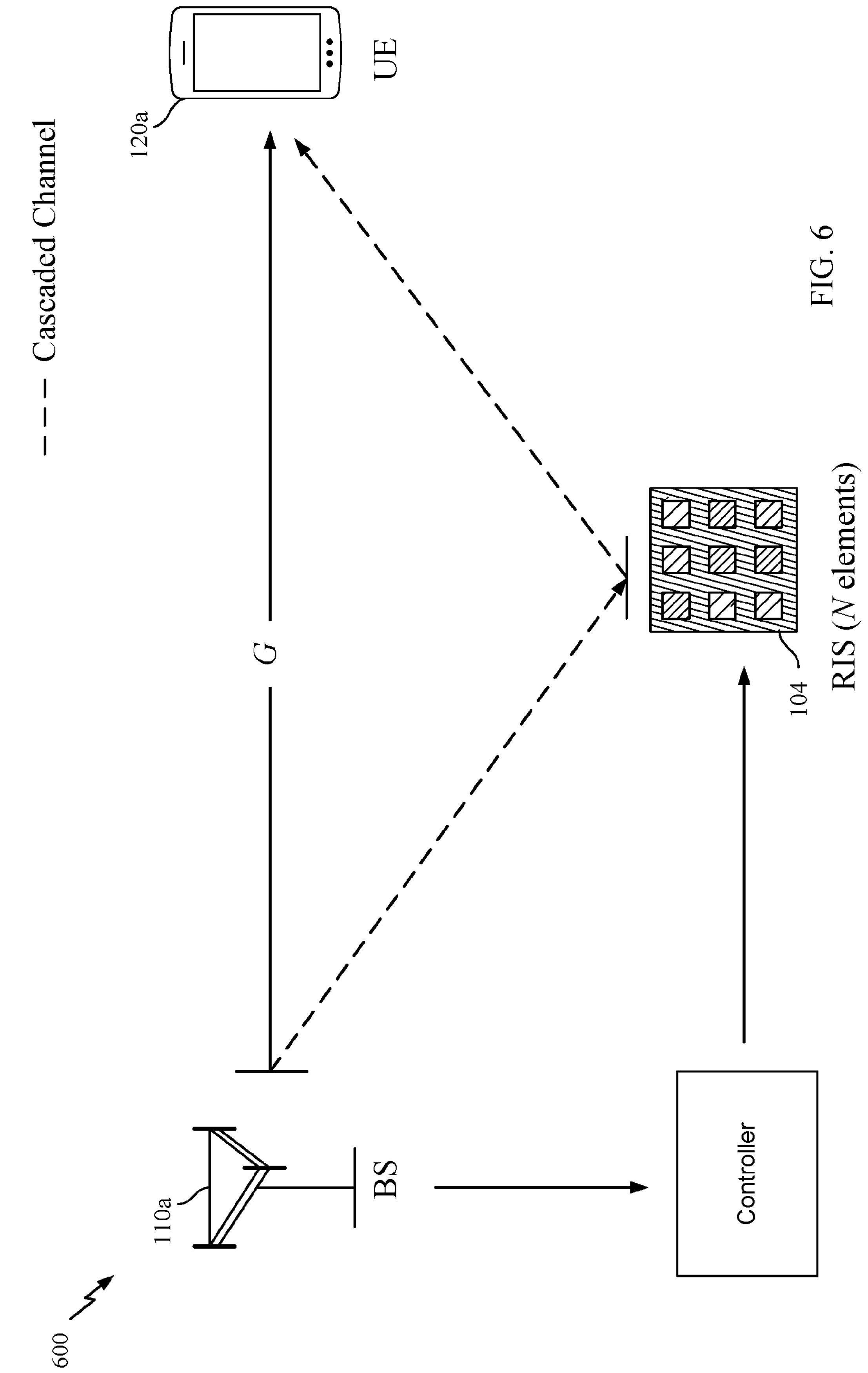
FIG. 6 illustrates example channel estimation in RIS-aided communication systems, in accordance with certain aspects of the present disclosure.

FIG. 6 illustrates example channel estimation 600 in RIS-aided communication systems, in accordance with certain aspects of the present disclosure. As shown in FIG. 6, to estimate the channel, G, RIS 104 may be turned off. However, to estimate the cascaded channel, which consists of the channel from BS 110*a* to RIS 104 and from RIS 104 to UE 120*a*, RIS 104 may be turned back on. Accordingly, techniques for activating and/or deactivating an RIS, for at least, channel estimation purposes, may be desired. Further, while FIG. 6 illustrates channel estimation in an RIS-aided communication system involving only one RIS, other systems may include any number of RISs thereby further increasing the difficulty of channel estimation and significantly increasing the overhead. In particular, overhead for cascaded channel estimation is the product of the number of RIS reflective elements and the number of UEs in the RIS-aided communications system, thus, when the number of RISs increases (exponentially increasing the number of reflective elements), the overhead for cascaded channel estimation becomes prohibitively high. For this reason, grouping RISs may be desired to provide an efficient way to activate and/or deactivate RISs (based on their groupings) in an RIS-aided communication system involving multiple RISs.

In addition to channel estimation, techniques for the activation and/or deactivation of RISs (or groups of RISs) when multiple RISs are available may be desired for other reasons, such as, to avoid interference. For example, due to the uncontrollable nature of reflections at an RIS when turned on, the likelihood of interference with transmissions from other UEs, or from the same UE (e.g., inter-symbol interference), is significantly increased. Further, in systems deploying multiple RISs, the chances of interference are even greater. Thus, it may be beneficial to control the selection, or grouping, of RISs that are activated and/or deactivated at a time, to decrease the potential for interference when multiple RISs are available.

Example Reconfigurable Intelligent Surface (RIS) Selection and Grouping for Activation Deactivation The present disclosure provides techniques for the activation and/or deactivation of reconfigurable intelligent surfaces (RISs) (or groups of RISs) when multiple RISs are available. For example, aspects herein describe the selection of RIS(s), the grouping of RIS(s), and the pairing of one or more RISs to one or more user equipments (UEs) (e.g., UE-RIS pairing) for activation/deactivation. Based upon the selection, grouping, and/or pairing, signaling may be introduced to control the state of one or more RISs. A state of an RIS may be either an awake state where the RIS is activated or a sleep state where the RIS is deactivated. As used herein, activate means to turn on and participate in ongoing activity in an RIS-aided wireless communication system, and more specifically, turn on and aid in the reflection and beamforming of one or more transmissions.

Accordingly, the techniques described herein enable a network entity (e.g., a base station (BS)) to intelligently make decisions regarding the selection and control of RIS(s) in an RIS-aided wireless communication system such that, at least, transmission interference may be avoided and channel estimation and/or positioning may be accommodated. Further, grouping of RISs may help to reduce signaling overhead by avoiding activation/deactivation signaling for each individual RIS deployed in the wireless communication system.

In addition, aspects of the present disclosure may allow a network entity configured to control multiple RISs in the RIS-aided wireless communication system to save power. For example, assuming there are K RISs controlled by the network entity (e g., each RIS is controlled by one network entity and not shared among multiple network entities), where K is an integer greater than one, instead of monitoring all K RISs all the time, the network entity may select (e.g., determine and select) one RIS or a subset of RISs of the K RISs to monitor at a time, thereby reducing power consumption at the network entity.

Figure 7:
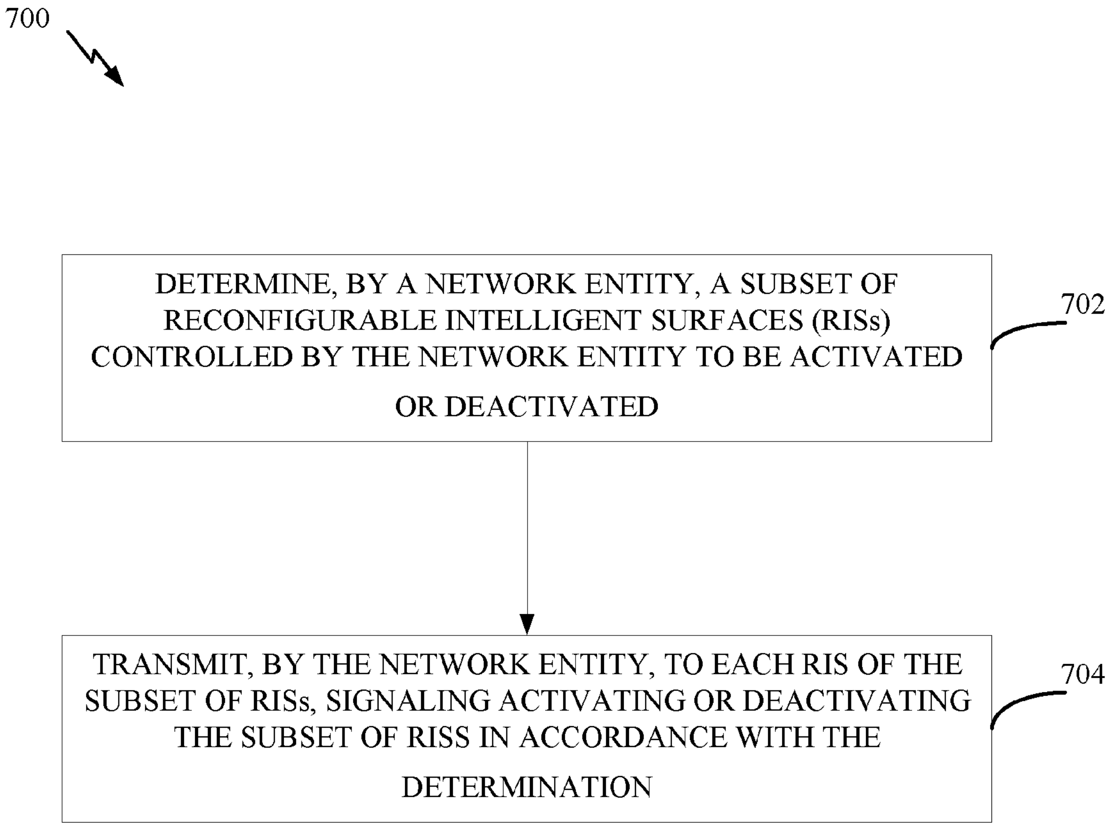
FIG. 7 is a flow diagram illustrating example operations by a UE, in accordance with certain aspects of the present disclosure.

FIG. 7 is a flow diagram illustrating example operations 700 for wireless communication by a network entity, in accordance with certain aspects of the present disclosure. Operations 700 may be performed, for example, by the BS 110*a* in the wireless communication system 100 of FIG. 1.

Operations 700 may be implemented as software components that are executed and run on one or more processors (e.g., controller/processor 240 of FIG. 2). Further, the transmission and reception of signals by the network entity in operations 700 may be enabled, for example, by one or more antennas (e.g., antennas 234 of FIG. 2). In certain aspects, the transmission and/or reception of signals by the network entity may be implemented via a bus interface of one or more processors (e.g., controller/processor 240) obtaining and/or outputting signals.

Operations 700 begin, at block 702, by the network entity determining a subset of RISs controlled by the network entity to be activated or deactivated. At block 704, the network entity transmits, to each RIS of the subset of RISs, signaling activating or deactivating the subset of RISs in accordance with the determination. In response to receiving such signaling, each RIS of the subset of RISs may activate or deactivate in accordance with the signaling.

According to certain aspects, in some cases, the network entity transmits, to each RIS of the subset of RISs, signaling activating or deactivating the subset of RISs through a UE. Accordingly, the UE may act as a relay UE that receives the signaling from the upstream network entity and forwards the signaling to one or more downstream RISs. Such a case may occur when the network entity is far away from the RIS(s) for which the signaling is directed for, or when there is communication blockage between the network entity and the RIS(s).

Figure 8:
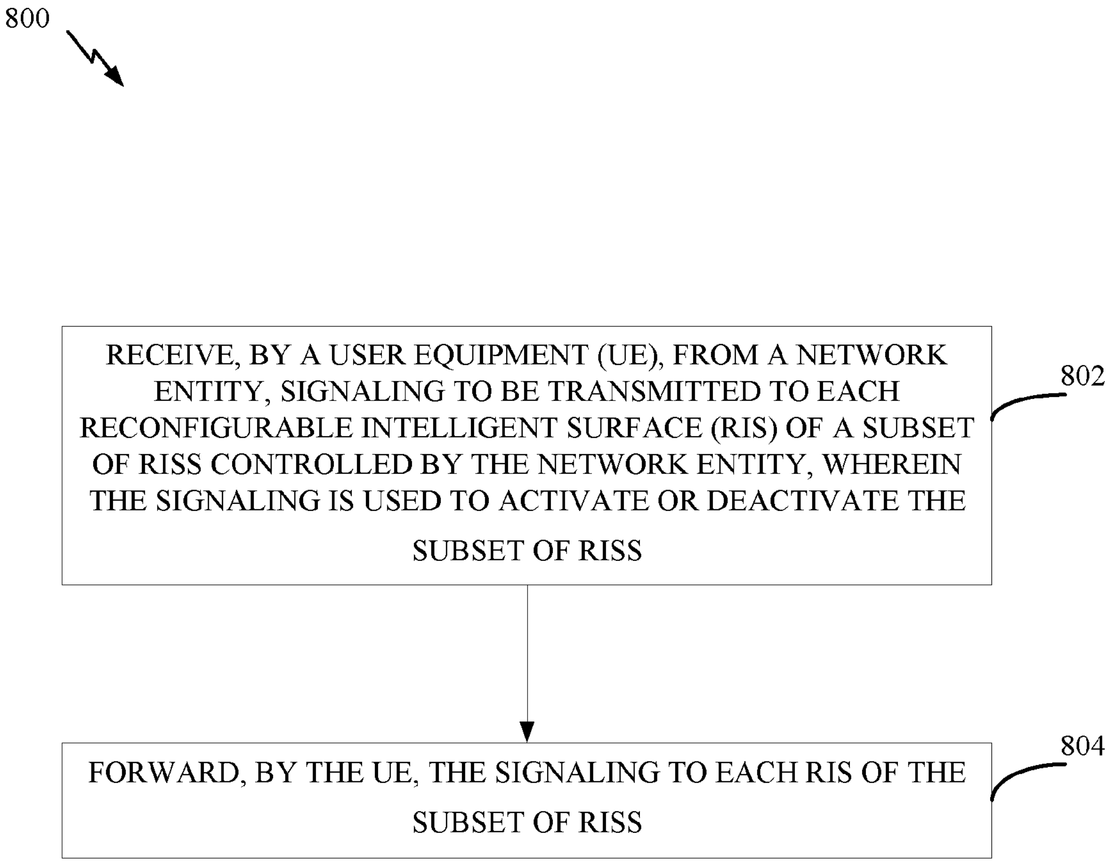
FIG. 8 illustrates an example call flow for changing beamforming types, in accordance with certain aspects of the present disclosure.

FIG. 8 is a flow diagram illustrating example operations 800 for wireless communication by a UE, in accordance with certain aspects of the present disclosure. Operations 800 may be performed, for example, by the UE 120*a* in the wireless communication system 100 of FIG. 1. As discussed, operations 800 performed by the UE may aid operations 700 performed by the network entity.

Operations 800 may be implemented as software components that are executed and run on one or more processors (e.g., controller/processor 280 of FIG. 2). Further, the transmission and reception of signals by the UE in operations 800 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

Operations 800 begin, at block 802, by a UE receiving, from a network entity, signaling to be transmitted to each RIS of a subset of RISs controlled by the network entity, wherein the signaling is used to activate or deactivate the subset of RISs. At block 804, the network entity forwards the signaling to each RIS of the subset of RISs.

According to certain aspects, signaling transmitted by the network entity to activate or deactivate a subset of RISs (e.g., one or more RISs) may include at least one of radio resource control (RRC) signaling, medium access control (MAC) control element (CE) (MAC-CE) signaling, or downlink control information (DCI). In some cases, the signaling may include a DCI having a bitmap corresponding to the RISs controlled by the network entity. The DCI may be a special DCI, a DCI using reserved bits, a DCI scrambled with RIS radio network temporary identifier (RNTI) (e.g., an RNTI defined for an RIS), etc. In cases where the DCI is a DCI scrambled with RIS RNTI, the DCI may include the bitmap and RIS specific parameters. The bitmap may include, for each RIS of the subset of RISs to be activated or deactivated, a bit indicating activation or deactivation. For example, assuming four RISs (e.g., RIS 1, RIS 2, RIS 3, and RIS 4) are controlled by a network entity. A special DCI transmitted by the network entity may include a four-bit bitmap, wherein each bit of the four-bit bitmap corresponds to one of the four RISs controlled by the network entity. Accordingly, where the network entity selects to activate RIS 1 and RIS 3, but not RIS 2 and RIS 4, the bits corresponding to RIS 1 and RIS 3 may indicate to RIS 1 and RIS 3 to activate, while the bits corresponding to RIS 2 and RIS 4 may indicate to RIS 2 and RIS 4 to deactivate. In some cases, the special DCI may be a group common DCI such that all RISs (e.g., RIS controllers) of the group decode the DCI.

In some cases where a relay UE is used to relay the signaling for activation/deactivation from a network entity to a subset of RISs, the signaling may be transmitted by the UE (subsequent to receiving the signaling from the network entity) via RRC signaling, sidelink MAC-CE signaling, or sidelink control information (SCI). As described previously, communication between devices may be referred to as the sidelink.

According to certain aspects, in addition to signaling the activation or deactivation of a subset of RISs, the network entity may also transmit an indication of a duration of the activation, or the deactivation, of the subset of RISs. The indication may be transmitted via the bitmap of a special DCI (where a special DCI is used to transmit signaling activating or deactivating the subset of RISs), RRC signaling, MAC-CE signaling, or a dedicated DCI. In some cases, this indication may be transmitted to the subset of RISs through a relay UE (in addition to the signaling for activating or deactivating the subset of RISs).

In some cases, the duration for activation/deactivation may be defined by a number of slots or frames, such that the RIS(s) receiving the signaling are activated or deactivated for the indicated number of slots or frames. In cases where a bitmap is used (in a dedicated DCI) to indicate the activation/deactivation, the duration may define an amount of time for which the bitmap (indicating whether RIS(s) are on are off) is to take effect. Once the signaling is received, e.g., activation is triggered, RIS(s) selected to be activated and signaled for activation may be activated for the defined duration. Additionally, once the signaling is received, e.g., deactivation is triggered, RIS(s) selected to be deactivated and signaled for deactivation may be deactivated for the defined duration. At the conclusion of the duration, the RIS(s) may return to a configured default state of participation. Specifically, RISs controlled by the network entity may each be configured with a default state of participation. The default state of participation may be one of an awake state (e.g., where the RIS is activated) or a sleep state (e.g., where the RIS is deactivated). In some cases, the default state of participation for an RIS may change based on signaling from the network entity. In some examples, the change in the default state of participation for an RIS may be indicated in the signaling activating and/or deactivating RISs in the subset of RISs. In some other examples, the default state of participation for an RIS may change at the conclusion of the defined duration, or at the expiration of a timer.

According to certain aspects, a network entity may be configured to group RISs controlled by the network entity into one or more groups. Accordingly, the network entity may transmit signaling activating or deactivating RISs in a group of RISs. RISs in the signaled group may activate or deactivate in accordance with the signaling received for the group of RISs.

Grouping of RISs may be used by the network entity in scenarios where there is a need for m active RISs at a time (e.g., where m is an integer greater than or equal to one), for example, in positioning, channel estimation, and similar applications. As an illustrative example, where ten RISs are controlled by a network entity and only two RISs of the ten RISs are needed to be activated at a time (e.g., for positioning), the network entity may group the ten RISs into groups of two RISs each, such that there are five RIS groups.

As mentioned previously, grouping of RISs may help to reduce signaling overhead by avoiding the need for activation/deactivation signaling for each individual RIS deployed in the wireless communication system. Instead, group common DCI (GC-DCI) may be used to activate or deactivate all RISs of a group of RISs. In some other cases, however, two bitmaps may be used where one bitmap is used to indicate a group, and another bitmap is used to indicate which RISs of the group are to be activated and which RISs of the group are to be deactivated.

Figure 9A:
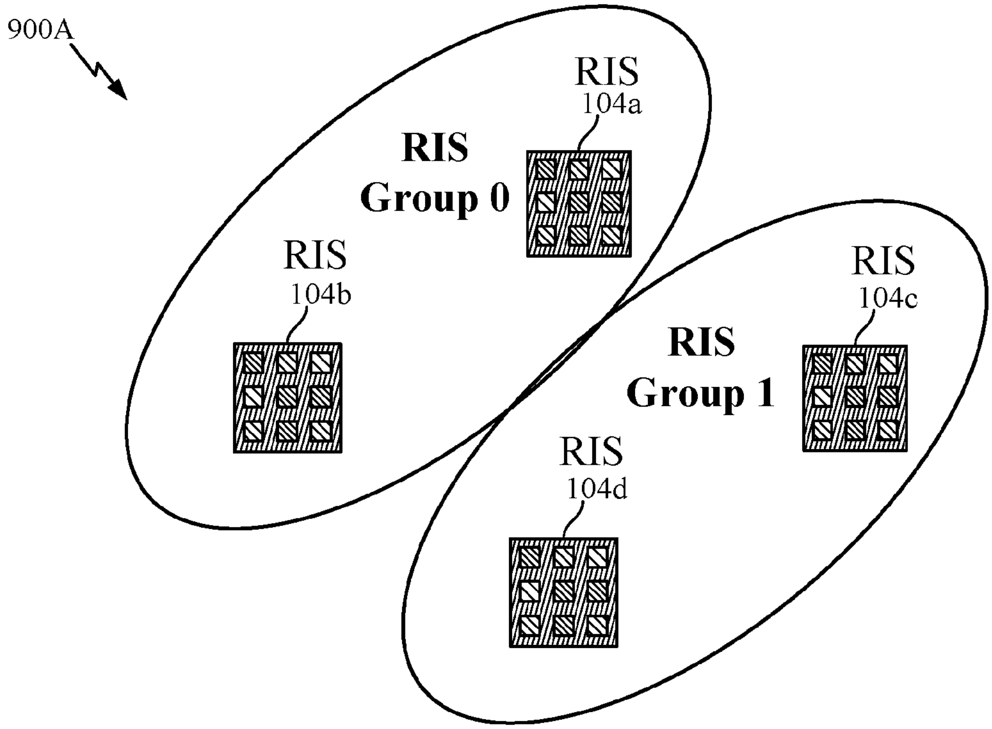
FIGS. 9A and 9B illustrate examples of RIS grouping, in accordance with certain aspects of the present disclosure.
Figure 9B:
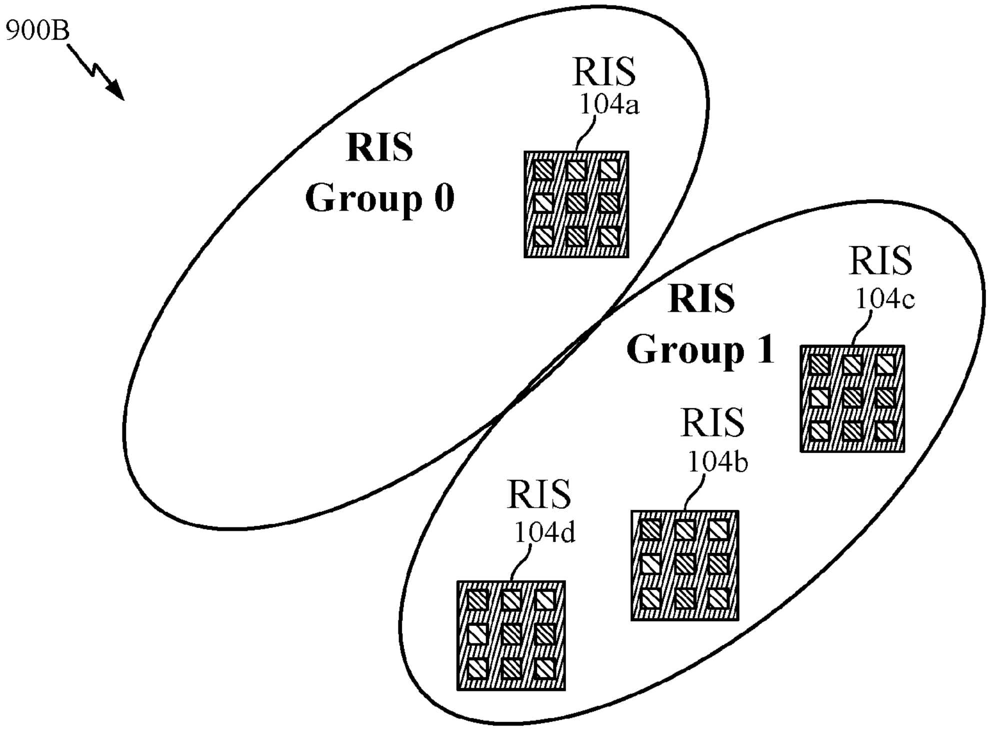

FIGS. 9A and 9B illustrate examples 900A and 900B of RIS grouping, in accordance with certain aspects of the present disclosure. As shown in FIG. 9A, where there are four RISs (e.g., RISs 104*a-d*) deployed and controlled by a network entity, the network entity may group two RISs, e.g., RIS 104*a* and RIS 104*b*, in RIS Group 0, and group the two remaining RISs, e.g., RIS 104*c* and 104*d*, in RIS Group 1, such that RIS Group 0 and RIS Group 1 include an equal number of RISs. In an alternative grouping illustrated in FIG. 9B, the network entity may group one RIS, e.g., RIS 104*a*, in RIS Group 1, and the three remaining RISs, e.g., RIS 104*b*, RIS 104*c*, and RIS 104*d*, in RIS Group 1, such that RIS Group 0 and RIS Group 1 do not contain an equal number of RISs. FIGS. 9A and 9B illustrate only two examples of RIS grouping; however, any grouping of RISs controlled by the network entity may be considered. An RIS group may contain only one RIS (e.g., as shown in FIG. 9B). Further, RISs in RIS groups may not be mutually exclusive (e.g., RIS 104*a* may belong to two RIS groups).

In some cases, a network entity may configure each RIS controlled by the network entity with an RIS group identifier (ID). For example, RRC signaling may be used to tag (e.g., designate by marking) each RIS controlled by the network entity with their respective RIS group ID. Accordingly, the network entity may group RISs according to the RIS group ID configured for each RIS, where each group is associated with a single RIS group ID. For example, referring back to FIG. 9A, in such a case, RIS 104*a* and RIS 104*b* may be configured with an RIS group ID associated with RIS Group 0 while RIS 104*c* and RIS 104*d* may be configured with an RIS group ID associated with RIS Group 1.

According to certain aspects, the network entity may group the RISs controlled by the network entity into groups based, at least in part, on a distance between each RIS controlled by the network entity, a capability of each RIS controlled by the network entity, a distance from each RIS controlled by the network entity to one or more UEs, and/or a threshold number of RIS elements (e.g., requiring the total number of elements per group to be above a threshold number to have a higher capability of controlling the beams). As an illustrative example, the network entity may determine a minimum number of elements per group is fourteen elements. Thus, in a case where four RISs are controlled by the network entity, and the first RIS (RIS 1) has four elements, the second RIS (RIS 2) has seven elements, the third RIS (RIS 3) has eight elements, and the fourth RIS (RIS 4) has ten elements, the network entity may determine to group RIS 1 and RIS 4 such that this group contains a total of fourteen elements (e.g., meeting the minimum of fourteen elements required) and group RIS 2 and RIS 3 such that this group contains a total of fifteen elements (e.g., meeting the minimum of fourteen elements required). As another illustrative example, assuming the same four RISs are controlled by the network entity, where two UEs are deployed in the system, the network entity may determine to group the RISs based on their distance to each UE. For example, if RIS 1, RIS 2, and RIS 3 are all closest in distance to the first UE and RIS 4 is closest in distance to the second UE, the network entity may determine RIS 1, RIS 2, and RIS 3 make up a first RIS group and RIS 4 makes up a second RIS group.

According to certain aspects, the network entity may pair one or more RISs with a UE to create UE-RIS pairs. In some cases, a UE-RIS pair may include at least two RISs paired with a single UE to be served, such that the two RISs (or more which are paired with the same UE) create an RIS group and the UE makes up a UE group. In some cases, a UE-RIS pair may include at least two RISs paired with at least two UEs to be served, such that the two RISs (or more) make up an RIS group and the two UEs (or more) make up a UE group. The latter example is illustrated in FIG. 10.

Figure 10:
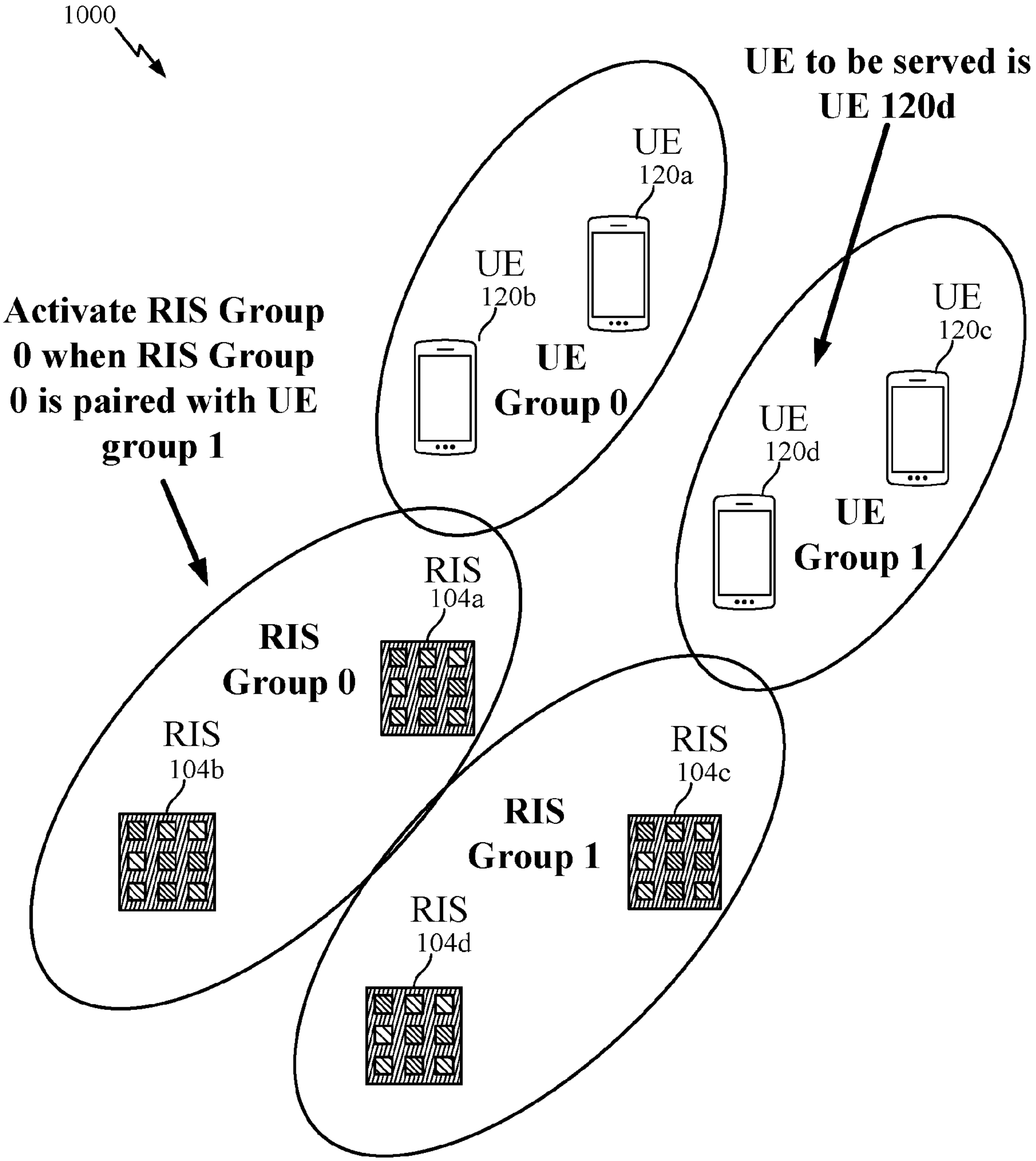
FIG. 10 illustrates an example of RIS group activation based on a UE to be served, in accordance with certain aspects of the present disclosure.

FIG. 10 illustrates an example 1000 of RIS group activation based on a UE to be served, in accordance with certain aspects of the present disclosure. As shown in FIG. 10, two RIS groups, RIS Group 0 and RIS Group 1, and two UE groups, UE Group 0 and UE Group 1, may be created (determined and grouped by the network entity). RIS Group 0 may contain RIS 104*a* and RIS 104*b* while RIS Group 1 may contain RIS 104*c* and RIS 104*d*. UE Group 0 may contain UE 120*a* and UE 120*b* while UE Group 1 may contain UE 120*c* and UE 120*d*. Assuming UE Group 0 is to be served by RISs of RIS Group 1, and UE Group 1 is to be served by RISs of Group 0, if at a particular time, UE 120*d* needs to receive transmissions from the network entity, UE 120*d* may be the UE to be served. Accordingly, because UE 120*d* is part of UE Group 1 which corresponds to RIS Group 0, RISs in RIS Group 0 may be activated to serve UE 120*d* of UE Group 1. RISs of RIS Group 1 may not be activated at this time because they are not part of the (pre-determined) UE-RIS pairing.

According to certain aspects, a network entity may receive a recommendation of RISs controlled by the network entity to be activated or deactivated. For example, the recommendation may be received from a UE, where the recommendation is based on channel estimations. Accordingly, the network entity may determine the subset of RISs to be activated or deactivated based, at least in part, on the recommendation. The recommendation may be received by the network entity (and transmitted by a UE) via MAC-CE signaling, uplink control information (UCI) in a physical uplink control channel (PUCCH), or UCI multiplexed with a physical uplink shared channel (PUSCH).

In some cases, the network entity may receive multiple recommendations from multiple UEs. In such a case, the network entity may determine the subset of RISs to be activated or deactivated in accordance with a majority of the multiple recommendations. For example, assuming five UEs provide the network entity with a recommendation for activation/deactivation, and three of those five recommendations indicate a first RIS group is to be activated (with all other RIS groups deactivated). Regardless of what the other two recommendations indicate, the network entity may determine to activate the first RIS group (and deactivate remaining groups) given three of the five recommendations (e.g., a majority of the recommendations) recommend this activation/deactivation arrangement.

Example Wireless Communications Devices

Figure 11:
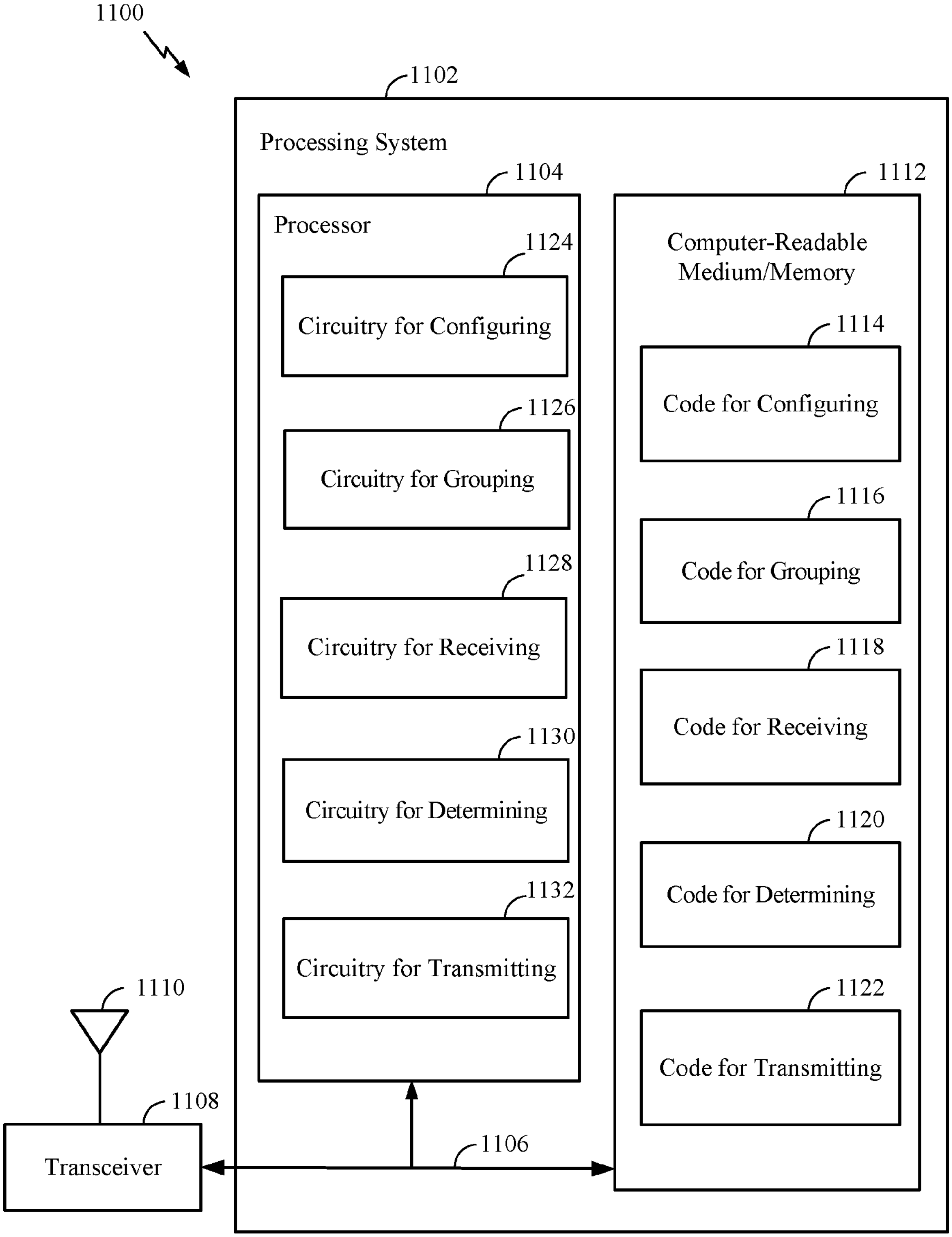
FIG. 11 illustrates a communications device that may include various components configured to perform operations for the techniques disclosed herein in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIG. 7.

Communications device 1100 includes a processing system 1102 coupled to a transceiver 1108 (e.g., a transmitter and/or a receiver). Transceiver 1108 is configured to transmit and receive signals for the communications device 1100 via an antenna 1110, such as the various signals as described herein. Processing system 1102 may be configured to perform processing functions for communications device 1100, including processing signals received and/or to be transmitted by communications device 1100.

Processing system 1102 includes a processor 1104 coupled to a computer-readable medium/memory 1112 via a bus 1106. In certain aspects, computer-readable medium/memory 1112 is configured to store instructions (e.g., computer-executable code) that when executed by processor 1104, cause processor 1104 to perform the operations illustrated in FIG. 7, or other operations for performing the various techniques discussed herein for controlling activation and/or deactivation of reconfigurable intelligent surfaces (RISs) (or groups of RISs) when multiple RISs are available. In some cases, the processor 1104 can include one or more components of BS 110 with reference to FIG. 2 such as, for example, controller/processor 240 (including the RIS control and grouping manager 112), transmit processor 220, receive processor 238, and/or the like. Additionally, in some cases, the computer-readable medium/memory 1112 can include one or more components of BS 110 with reference to FIG. 2 such as, for example, memory 242 and/or the like.

In certain aspects, computer-readable medium/memory 1112 stores code 1114 for configuring, code 1116 for grouping, code 1118 for receiving, code 1120 for determining, and code 1122 for transmitting.

In some cases, code 1114 for configuring may include code for configuring each RIS controlled by the network entity with an RIS group identifier (ID).

In some cases, code 1116 for grouping may include code for grouping the RISs controlled by the network entity into one or more groups and wherein each RIS of the subset of RISs belongs to a same group of the one or more groups. In some cases, code 1116 for grouping may include code for grouping the RISs controlled by the network entity into the one or more groups based, at least in part, on the RIS group ID configured for each RIS, wherein each group of the one or more groups is associated with a single RIS group ID.

In some cases, code 1118 for receiving may include code for receiving, from a user equipment (UE), a recommendation of RISs controlled by the network entity to be activated or deactivated, and wherein determining the subset of RISs to be activated or deactivated is based, at least in part, on the recommendation. In some cases, code 1118 for receiving may include code for receives multiple recommendations from multiple UEs, wherein determining the subset of RISs to be activated or deactivated is in accordance with a majority of the multiple recommendations.

In some cases, code 1120 for determining may include code for determining a subset of RISs controlled by the network entity to be activated or deactivated.

In some cases, code 1122 for transmitting may include code for transmitting, to each RIS of the subset of RISs, signaling activating or deactivating the subset of RISs in accordance with the determination. In some cases, code 1122 for transmitting may include code for transmitting an indication of a duration for the activation or the deactivation of the subset of RISs, wherein the indication of the duration is transmitted via the bitmap, radio resource control (RRC) signaling, medium access control (MAC) control element (CE) (MAC-CE) signaling, or dedicated downlink control information (DCI).

In certain aspects, processor 1104 has circuitry configured to implement the code stored in the computer-readable medium/memory 1112. For example, processor 1104 includes circuitry 1124 for configuring, circuitry 1126 for grouping, circuitry 1128 for receiving, circuitry 1130 for determining, and circuitry 1132 for transmitting.

In some cases, circuitry 1124 for configuring may include circuitry for configuring each RIS controlled by the network entity with an RIS group identifier (ID).

In some cases, circuitry 1126 for grouping may include circuitry for grouping the RISs controlled by the network entity into one or more groups and wherein each RIS of the subset of RISs belongs to a same group of the one or more groups. In some cases, circuitry 1126 for grouping may include circuitry for grouping the RISs controlled by the network entity into the one or more groups based, at least in part, on the RIS group ID configured for each RIS, wherein each group of the one or more groups is associated with a single RIS group ID.

In some cases, circuitry 1128 for receiving may include circuitry for receiving, from a UE, a recommendation of RISs controlled by the network entity to be activated or deactivated, and wherein determining the subset of RISs to be activated or deactivated is based, at least in part, on the recommendation. In some cases, circuitry 1128 for receiving may include circuitry for receives multiple recommendations from multiple UEs, wherein determining the subset of RISs to be activated or deactivated is in accordance with a majority of the multiple recommendations.

In some cases, circuitry 1130 for determining may include circuitry for determining a subset of RISs controlled by the network entity to be activated or deactivated.

In some cases, circuitry 1132 for transmitting may include circuitry for transmitting, to each RIS of the subset of RISs, signaling activating or deactivating the subset of RISs in accordance with the determination. In some cases, circuitry 1132 for transmitting may include circuitry for transmitting an indication of a duration for the activation or the deactivation of the subset of RISs, wherein the indication of the duration is transmitted via the bitmap, RRC signaling, MAC-CE signaling, or dedicated DCI.

In some cases, the operations illustrated in FIG. 7, as well as other operations described herein for controlling activation and/or deactivation of RISs (or groups of RISs) when multiple RISs are available, may be implemented by one or means-plus-function components. For example, in some cases, such operations may be implemented by means for configuring, means for grouping, means for receiving (or means for obtaining), means for determining, and means for transmitting (or means for outputting for transmission).

In some cases, means for transmitting (or means for outputting for transmission) includes a transmitter (such as the transmit processor 220) and/or an antenna(s) 234 or the BS 110 illustrated in FIG. 2 and/or circuitry 1132 for transmitting of the communication device 1100 in FIG. 11.

In some cases, means for receiving (or means for obtaining) includes a receiver (such as the receive processor 238) and/or an antenna(s) 234 of the BS 110 illustrated in FIG. 2 and/or circuitry 1128 for receiving of the communication device 1100 in FIG. 11.

In some cases, means for configuring, means for grouping, and means for determining, includes a processing system, which may include one or more processors, such as the receive processor 238, the transmit processor 220, the TX MIMO processor 230, and/or the controller/processor 240 of the BS 110 illustrated in FIG. 2 and/or the processing system 1102 of the communication device 1100 in FIG. 11.

Figure 12:
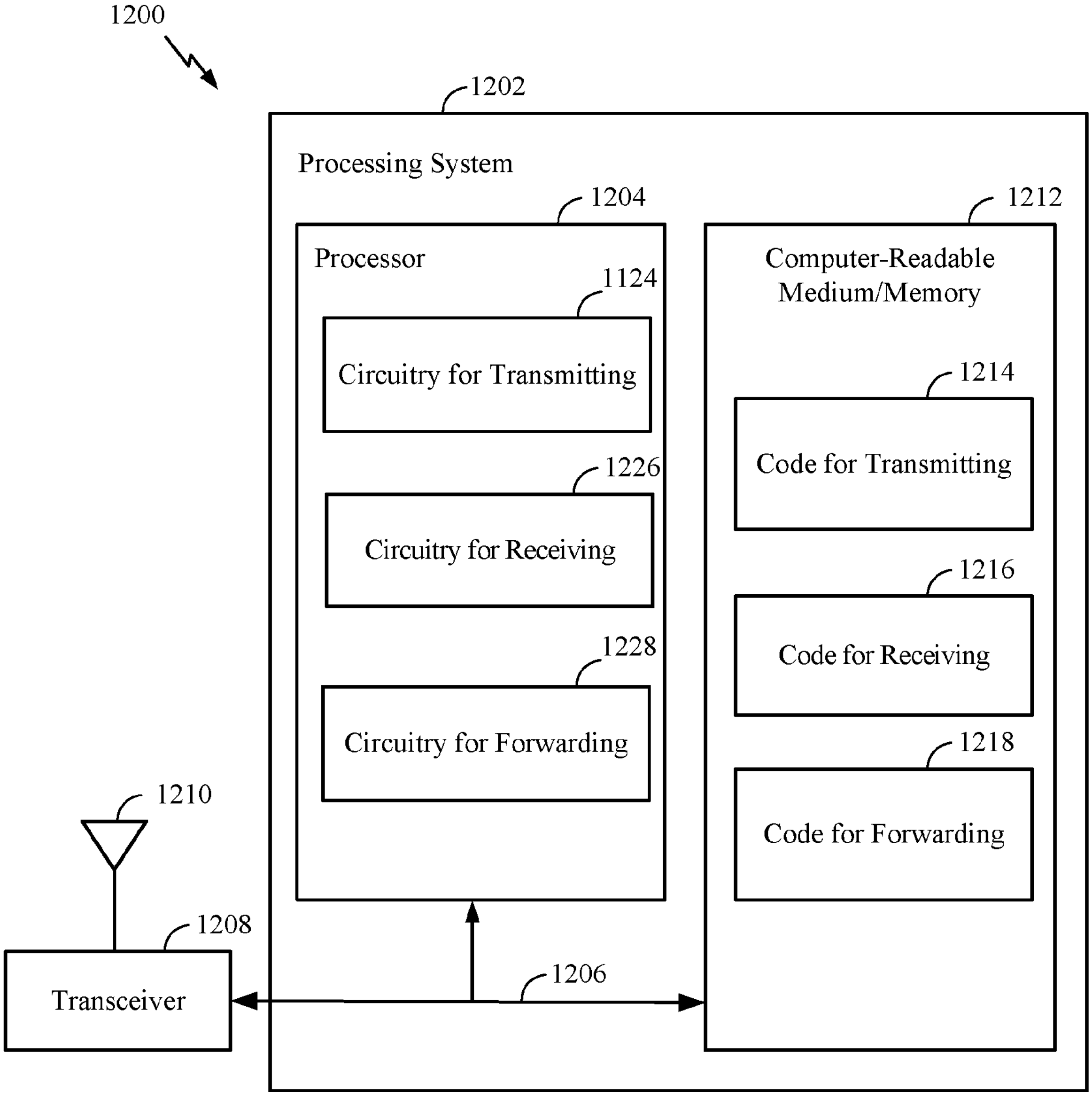
FIG. 12 illustrates a communications device that may include various components configured to perform operations for the techniques disclosed herein in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIG. 8.

Communications device 1200 includes a processing system 1202 coupled to a transceiver 1208 (e.g., a transmitter and/or a receiver). Transceiver 1208 is configured to transmit and receive signals for the communications device 1200 via an antenna 1210, such as the various signals as described herein. Processing system 1202 may be configured to perform processing functions for communications device 1200, including processing signals received and/or to be transmitted by communications device 1200.

Processing system 1202 includes a processor 1204 coupled to a computer-readable medium/memory 1212 via a bus 1206. In certain aspects, computer-readable medium/memory 1212 is configured to store instructions (e.g., computer-executable code) that when executed by processor 1204, cause processor 1204 to perform the operations illustrated in FIG. 8, or other operations for performing the various techniques discussed herein for controlling activation and/or deactivation of RISs (or groups of RISs) when multiple RISs are available. In some cases, the processor 1204 can include one or more components of UE 120 with reference to FIG. 2 such as, for example, controller/processor 280 (including the RIS control and grouping manager 122), transmit processor 264, receive processor 258, and/or the like. Additionally, in some cases, the computer-readable medium/memory 1212 can include one or more components of UE 120 with reference to FIG. 2 such as, for example, memory 282 and/or the like.

In certain aspects, computer-readable medium/memory 1212 stores code 1214 for transmitting, code 1216 for receiving, and code 1218 for forwarding.

In some cases, code 1214 for transmitting may include code for transmitting, to a network entity, a recommendation of RISs controlled by the network entity to be activated or deactivated, and wherein the signaling, received from the network entity, is based, at least in part, on the recommendation.

In some cases, code 1216 for receiving may include code for receiving, from a network entity, signaling to be transmitted to each RIS of a subset of RISs controlled by the network entity, wherein the signaling is used to activate or deactivate the subset of RISs.

In some cases, code 1218 for forwarding may include code for forwarding the signaling to each RIS of the subset of RISs.

In certain aspects, processor 1204 has circuitry configured to implement the code stored in the computer-readable medium/memory 1212. For example, processor 1204 includes circuitry 1224 for transmitting, circuitry 1226 for receiving, and circuitry 1228 for forwarding.

In some cases, circuitry 1224 for transmitting may include circuitry for transmitting, to a network entity, a recommendation of RISs controlled by the network entity to be activated or deactivated, and wherein the signaling, received from the network entity, is based, at least in part, on the recommendation.

In some cases, circuitry 1226 for receiving may include circuitry for receiving, from a network entity, signaling to be transmitted to each RIS of a subset of RISs controlled by the network entity, wherein the signaling is used to activate or deactivate the subset of RISs.

In some cases, circuitry 1228 for forwarding may include circuitry for forwarding the signaling to each RIS of the subset of RISs.

In some cases, the operations illustrated in FIG. 8, as well as other operations described herein for controlling activation and/or deactivation of RISs (or groups of RISs) when multiple RISs are available, may be implemented by one or means-plus-function components. For example, in some cases, such operations may be implemented by means for transmitting (or means for outputting for transmission), means for receiving (or means for obtaining), and means for forwarding.

In some cases, means for transmitting (or means for outputting for transmission) or means for forwarding includes a transmitter (such as the transmit processor 264) and/or an antenna(s) 252 of the UE 120 illustrated in FIG. 2 and/or circuitry 1224 for transmitting or circuitry 1228 for forwarding of the communication device 1200 in FIG. 12.

In some cases, means for receiving (or means for obtaining) includes a receiver (such as the receive processor 258) and/or an antenna(s) 252 of the UE 120 illustrated in FIG. 2 and/or circuitry 1226 for receiving of the communication device 1200 in FIG. 12.

RIS control and grouping manager 112 and 122 may support wireless communication in accordance with examples as disclosed herein.

RIS control and grouping manager 112 and 122 may be an example of means for performing various aspects described herein. RIS control and grouping manager 112 and 122, or its sub-components, may be implemented in hardware (e.g., in uplink (UL) resource management circuitry). The circuitry may comprise of processor, DSP, an ASIC, a FPGA or other programmable logic device, discrete gate or transistor logic, discrete hardware components, or any combination thereof designed to perform the functions described in the present disclosure.

In another implementation, RIS control and grouping manager 112 and 122, or its sub-components, may be implemented in code (e.g., as configuration management software or firmware) executed by a processor, or any combination thereof. If implemented in code executed by a processor, the functions of RIS control and grouping manager 112 and 122, or its sub-components may be executed by a general-purpose processor, a DSP, an ASIC, a FPGA or other programmable logic device.

In some examples, RIS control and grouping manager 112 and 122 may be configured to perform various operations (e.g., receiving, determining, transmitting) using or otherwise in cooperation with the transceiver 1108 or 1208.

RIS control and grouping manager 112 and 122, or its sub-components, may be physically located at various positions, including being distributed such that portions of functions are implemented at different physical locations by one or more physical components. In some examples, RIS control and grouping manager 112 and 122, or its sub-components, may be a separate and distinct component in accordance with various aspects of the present disclosure. In some examples, RIS control and grouping manager 112 and 122, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Example Clauses

Implementation examples are described in the following numbered clauses:

Clause 1: A method for wireless communication by a network entity comprising: determining a subset of reconfigurable intelligent surfaces (RISs) controlled by the network entity to be activated or deactivated; and transmitting, to each RIS of the subset of RISs, signaling activating or deactivating the subset of RISs in accordance with the determination.

Clause 2: The method of Clause 1, wherein the signaling comprises at least one of: radio resource control (RRC) signaling, medium access control (MAC) control element (CE) (MAC-CE) signaling, or downlink control information (DCI).

Clause 3: The method of Clause 1 or 2, wherein the signaling comprises a downlink control information (DCI) having a bitmap corresponding to the RISs controlled by the network entity, wherein the bitmap includes for each RIS of the subset of RISs a bit indicating activation or deactivation in accordance with the determination.

Clause 4: The method of Clause 3, further comprising: transmitting an indication of a duration for the activation or the deactivation of the subset of RISs, wherein the indication of the duration is transmitted via: the bitmap, radio resource control (RRC) signaling, medium access control (MAC) control element (CE) (MAC-CE) signaling, or dedicated downlink control information (DCI).

Clause 5: The method of Clause 4, wherein the duration is defined by a number of slots.

Clause 6: The method of any of Clauses 1-5, wherein the signaling is transmitted to each RIS of the subset of RISs through a user equipment (UE).

Clause 7: The method of Clause 6, wherein the signaling is transmitted via: radio resource control (RRC) signaling, sidelink medium access control (MAC) control element (CE) (MAC-CE) signaling, or sidelink control information (SCI).

Clause 8: The method of any of Clauses 1-7, further comprising: grouping the RISs controlled by the network entity into one or more groups; and wherein each RIS of the subset of RISs belongs to a same group of the one or more groups.

Clause 9: The method of Clause 8, wherein grouping the RISs controlled by the network entity into the one or more groups comprises: configuring each RIS controlled by the network entity with an RIS group identifier (ID); and grouping the RISs controlled by the network entity into the one or more groups based, at least in part, on the RIS group ID configured for each RIS, wherein each group of the one or more groups is associated with a single RIS group ID.

Clause 10: The method of Clause 8 or 9, wherein grouping the RISs controlled by the network entity into the one or more groups is based, at least in part, on at least one of: a distance between each RIS controlled by the network entity; a capability of each RIS controlled by the network entity; a distance from each RIS controlled by the network entity to one or more user equipments (UEs); and a threshold number of RIS elements.

Clause 11: The method of any of Clauses 8-10, wherein the signaling comprises group-common downlink control information (GC-DCI) activating or deactivating the subset of RISs in the same group.

Clause 12: The method of any of Clauses 8-11, wherein each group of the one or more groups is associated with one or more user equipments (UEs) to be served by RISs in each group, wherein a UE of the one or more UEs may be served by at least one group of the one or more groups.

Clause 13: The method of Clause 12, wherein the at least one group of the one or more groups serving the UE comprises at least one group of the one or more groups assisting the UE in downlink (DL) or uplink (UL) communication with the network entity.

Clause 14: The method of any of Clauses 1-13, further comprising: receiving, from a user equipment (UE), a recommendation of RISs controlled by the network entity to be activated or deactivated; and wherein determining the subset of RISs to be activated or deactivated is based, at least in part, on the recommendation.

Clause 15: The method of Clause 14, wherein the recommendation is received via: medium access control (MAC)-control element (CE) (MAC-CE) signaling, uplink control information (UCI) in a physical uplink control channel (PUCCH), or UCI multiplexed with a physical uplink shared channel (PUSCH).

Clause 16: The method of Clause 14 or 15, wherein: the network entity receives multiple recommendations from multiple UEs; and determining the subset of RISs to be activated or deactivated is in accordance with a majority of the multiple recommendations.

Clause 17: The method of any of Clauses 1-16, wherein the RISs controlled by the network entity are each configured with a default state of participation, wherein the default state of participation comprises: an awake state where an RIS is activated, or a sleep state where an RIS is deactivated.

Clause 18: The method of any of Clauses 1-17, wherein the signaling further indicates a default state of participation for the subset of RISs, wherein the default state of participation comprises: an awake state where an RIS is activated, or a sleep state where an RIS is deactivated.

Clause 19: A method for wireless communication by a user equipment (UE) comprising: receiving, from a network entity, signaling to be transmitted to each reconfigurable intelligent surface (RIS) of a subset of RISs controlled by the network entity, wherein the signaling is used to activate or deactivate the subset of RISs; and forwarding the signaling to each RIS of the subset of RISs.

Clause 20: The method of Clause 19, wherein the signaling is forwarded via: radio resource control (RRC) signaling, sidelink medium access control (MAC)-control element (CE) (MAC-CE) signaling, or sidelink control information (SCI).

Clause 21: The method of Clause 18 or 20, wherein each RIS of the subset of RISs belongs to a same group of one or more groups created by the network entity.

Clause 22: The method of Clause 21, wherein each RIS of the subset of RISs belonging to the same group is configured with a same RIS group identifier (ID), the RIS group ID being associated with the group.

Clause 23: The method of Clause 21 or 22, wherein the one or more groups is based, at least in part, on at least one of: a distance between each RIS controlled by the network entity, a capability of each RIS controlled by the network entity, a distance from each RIS controlled by the network entity to one or more UEs, and a threshold number of RIS elements.

Clause 24: The method of any of Clauses 19-23, further comprising: transmitting, to a network entity, a recommendation of RISs controlled by the network entity to be activated or deactivated; and wherein the signaling, received from the network entity, is based, at least in part, on the recommendation.

Clause 25: The method of Clause 24, wherein the recommendation is transmitted via: medium access control (MAC)-control element (CE) (MAC-CE) signaling, uplink control information (UCI) in a physical uplink control channel (PUCCH), or UCI multiplexed with a physical uplink shared channel (PUSCH).

Clause 26: The method of Clause 24 or 25, wherein: the recommendation is one recommendation of multiple recommendations received by the network entity; and the signaling, received from the network entity is based, at least in part, on a majority of the multiple recommendations.

Clause 27: The method of any of Clauses 19-26, wherein the RISs controlled by the network entity are each configured with a default state of participation, wherein the default state of participation comprises: an awake state where an RIS is activated, or a sleep state where an RIS is deactivated.

Clause 28: The method of any of Clauses 19-27, wherein the signaling further indicates a default state of participation for the subset of RISs, wherein the default state of participation comprises: an awake state where an RIS is activated, or a sleep state where an RIS is deactivated.

Clause 29: An apparatus, comprising: at least one processor; and a memory coupled to the at least one processor, the memory including instructions executable by the at least one processor to cause the apparatus to perform a method in accordance with any one of Clauses 1-28.

Clause 30: An apparatus, comprising means for performing a method in accordance with any one of Clauses 1-28.

Clause 31: A non-transitory computer-readable medium comprising executable instructions that, when executed by one or more processors of an apparatus, cause the apparatus to perform a method in accordance with any one of Clauses 1-28.

Additional Considerations

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 7 and FIG. 8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a network entity, the method comprising:

determining a subset of reconfigurable intelligent surfaces (RISs) controlled by the network entity to be activated or deactivated;

grouping the RISs controlled by the network entity into one or more groups, wherein each RIS of the subset of RISs belongs to a same group of the one or more groups, wherein grouping the RISs controlled by the network entity into the one or more groups comprises:

configuring each RIS controlled by the network entity with an RIS group identifier (ID); and grouping the RISs controlled by the network entity into the one or more groups based, at least in part, on the RIS group ID configured for each RIS, wherein each group of the one or more groups is associated with a single RIS group ID; and transmitting, to each RIS of the subset of RISs, signaling activating or deactivating the subset of RISs in accordance with the determination.

2. The method of claim 1, wherein the signaling comprises at least one of:

radio resource control (RRC) signaling, medium access control (MAC) control element (CE) (MAC-CE) signaling, or downlink control information (DCI).

3. The method of claim 1, wherein the signaling comprises a downlink control information (DCI) having a bitmap corresponding to the RISs controlled by the network entity, and wherein the bitmap includes for each RIS of the subset of RISs a bit indicating activation or deactivation in accordance with the determination.

4. The method of claim 3, further comprising transmitting an indication of a duration for the activation or the deactivation of the subset of RISs, wherein the indication of the duration is transmitted via:
- the bitmap,
- radio resource control (RRC) signaling,
- medium access control (MAC) control element (CE) (MAC-CE) signaling, or
- dedicated DCI.

5. The method of claim 4, wherein the duration is defined by a number of slots.

6. The method of claim 1, wherein the signaling is transmitted to each RIS of the subset of RISs through a user equipment (UE).

7. The method of claim 6, wherein the signaling is transmitted via:
- radio resource control (RRC) signaling,
- sidelink medium access control (MAC) control element (CE) (MAC-CE) signaling, or
- sidelink control information (SCI).

8. The method of claim 1, wherein grouping the RISs controlled by the network entity into the one or more groups is based, at least in part, on at least one of:
- a distance between each RIS controlled by the network entity;
- a capability of each RIS controlled by the network entity;
- a distance from each RIS controlled by the network entity to one or more user equipments (UEs); and
- a threshold number of RIS elements.

9. The method of claim 1, wherein the signaling comprises group-common downlink control information (GC-DCI) activating or deactivating the subset of RISs in the same group.

10. The method of claim 1, wherein each group of the one or more groups is associated with one or more user equipments (UEs) to be served by RISs in each group, and wherein at least one UE of the one or more UEs is served by at least one group of the one or more groups.

11. The method of claim 10, wherein the at least one group of the one or more groups serving the at least one UE comprises at least one group of the one or more groups assisting the at least one UE in downlink (DL) or uplink (UL) communication with the network entity.

12. The method of claim 1, further comprising receiving, from a user equipment (UE), a recommendation of RISs controlled by the network entity to be activated or deactivated, wherein determining the subset of RISs to be activated or deactivated is based, at least in part, on the recommendation.

13. The method of claim 12, wherein the recommendation is received via:
- medium access control (MAC)-control element (CE) (MAC-CE) signaling,
- uplink control information (UCI) in a physical uplink control channel (PUCCH), or
- UCI multiplexed with a physical uplink shared channel (PUSCH).

14. The method of claim 12, wherein:
- the network entity receives multiple recommendations from multiple UEs; and
- determining the subset of RISs to be activated or deactivated is in accordance with a majority of the multiple recommendations.

15. The method of claim 1, wherein the RISs controlled by the network entity are each configured with a default state of participation, and wherein the default state of participation comprises:
- an awake state in which an RIS is activated, or
- a sleep state in which an RIS is deactivated.

16. The method of claim 1, wherein the signaling further indicates a default state of participation for the subset of RISs, and wherein the default state of participation comprises:
- an awake state in which an RIS is activated, or
- a sleep state in which an RIS is deactivated.

17. A method for wireless communication by a user equipment (UE), the method comprising:
- receiving, from a network entity, signaling to be transmitted to each reconfigurable intelligent surface (RIS) of a subset of RISs controlled by the network entity, wherein the signaling is used to activate or deactivate the subset of RISs, wherein each RIS of the subset of RISs belongs to a same group of one or more groups created by the network entity, and wherein each RIS of the subset of RISs belonging to the same group is configured with a same RIS group identifier (ID), the RIS group ID being associated with the group; and
- forwarding the signaling to each RIS of the subset of RISs.

18. The method of claim 17, wherein the signaling is forwarded via:
- radio resource control (RRC) signaling,
- sidelink medium access control (MAC)-control element (CE) (MAC-CE) signaling, or
- sidelink control information (SCI).

19. The method of claim 17, wherein the one or more groups is based, at least in part, on at least one of:
- a distance between each RIS controlled by the network entity,
- a capability of each RIS controlled by the network entity,
- a distance from each RIS controlled by the network entity to one or more UEs, and
- a threshold number of RIS elements.

20. The method of claim 17, further comprising transmitting, to a network entity, a recommendation of RISs controlled by the network entity to be activated or deactivated, wherein the signaling, received from the network entity, is based, at least in part, on the recommendation.

21. The method of claim 20, wherein the recommendation is transmitted via:
- medium access control (MAC)-control element (CE) (MAC-CE) signaling,
- uplink control information (UCI) in a physical uplink control channel (PUCCH), or
- UCI multiplexed with a physical uplink shared channel (PUSCH).

22. The method of claim 20, wherein:
- the recommendation is one recommendation of multiple recommendations received by the network entity; and
- the signaling, received from the network entity is based, at least in part, on a majority of the multiple recommendations.

23. The method of claim 17, wherein the RISs controlled by the network entity are each configured with a default state of participation, and wherein the default state of participation comprises:
- an awake state in which an RIS is activated, or
- a sleep state in which an RIS is deactivated.

24. The method of claim 17, wherein the signaling further indicates a default state of participation for the subset of RISs, and wherein the default state of participation comprises:

an awake state in which an RIS is activated, or a sleep state in which an RIS is deactivated.

25. An apparatus for wireless communication by a network entity, the apparatus comprising:

memory including computer executable instructions; and at least one processor configured to execute the computer executable instructions to cause the apparatus to:

determine a subset of reconfigurable intelligent surfaces (RISs) controlled by the network entity to be activated or deactivated;

group the RISs controlled by the network entity into one or more groups, wherein each RIS of the subset of RISs belongs to a same group of the one or more groups, and wherein grouping the RISs controlled by the network entity into the one or more groups comprises:

configuring each RIS controlled by the network entity with an RIS group identifier (ID); and grouping the RISs controlled by the network entity into the one or more groups based, at least in part, on the RIS group ID configured for each RIS, wherein each group of the one or more groups is associated with a single RIS group ID; and transmit, to each RIS of the subset of RISs, signaling activating or deactivating the subset of RISs in accordance with the determination.

26. An apparatus for wireless communication by a user equipment (UE), the apparatus comprising:

memory including computer executable instructions; and at least one processor configured to execute the computer executable instructions to cause the apparatus to:

receive, from a network entity, signaling to be transmitted to each reconfigurable intelligent surface (RIS) of a subset of RISs controlled by the network entity, wherein the signaling is used to activate or deactivate the subset of RISs, wherein each RIS of the subset of RISs belongs to a same group of one or more groups created by the network entity, and wherein each RIS of the subset of RISs belonging to the same group is configured with a same RIS group identifier (ID), the RIS group ID being associated with the group; and forward the signaling to each RIS of the subset of RISs.

* * * * *